Jan. 7, 1964 W. A. WOOTTEN 3,117,065

METHOD AND APPARATUS FOR MAKING MAGNETIC RECORDING TAPE

Filed Sept. 2, 1959 7 Sheets-Sheet 1

INVENTOR.
WILLIAM A. WOOTTEN
BY Lilly & Nyhagen
Attorneys

METHOD AND APPARATUS FOR MAKING MAGNETIC RECORDING TAPE

Filed Sept. 2, 1959 7 Sheets-Sheet 2

INVENTOR.
WILLIAM A. WOOTTEN
BY Lilly & Nyhagen
ATTORNEYS

INVENTOR.
WILLIAM A. WOOTTEN
BY Lilly & Nyhagen
ATTORNEYS

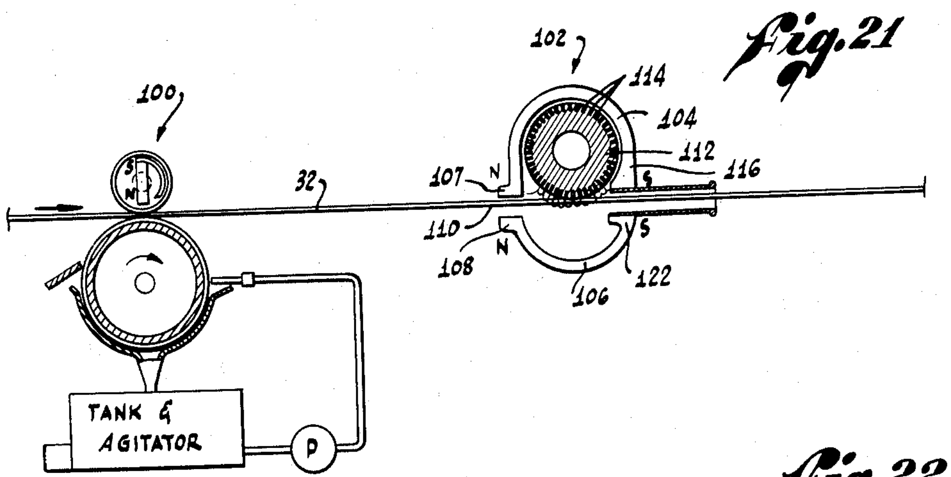
Fig. 21
Fig. 22
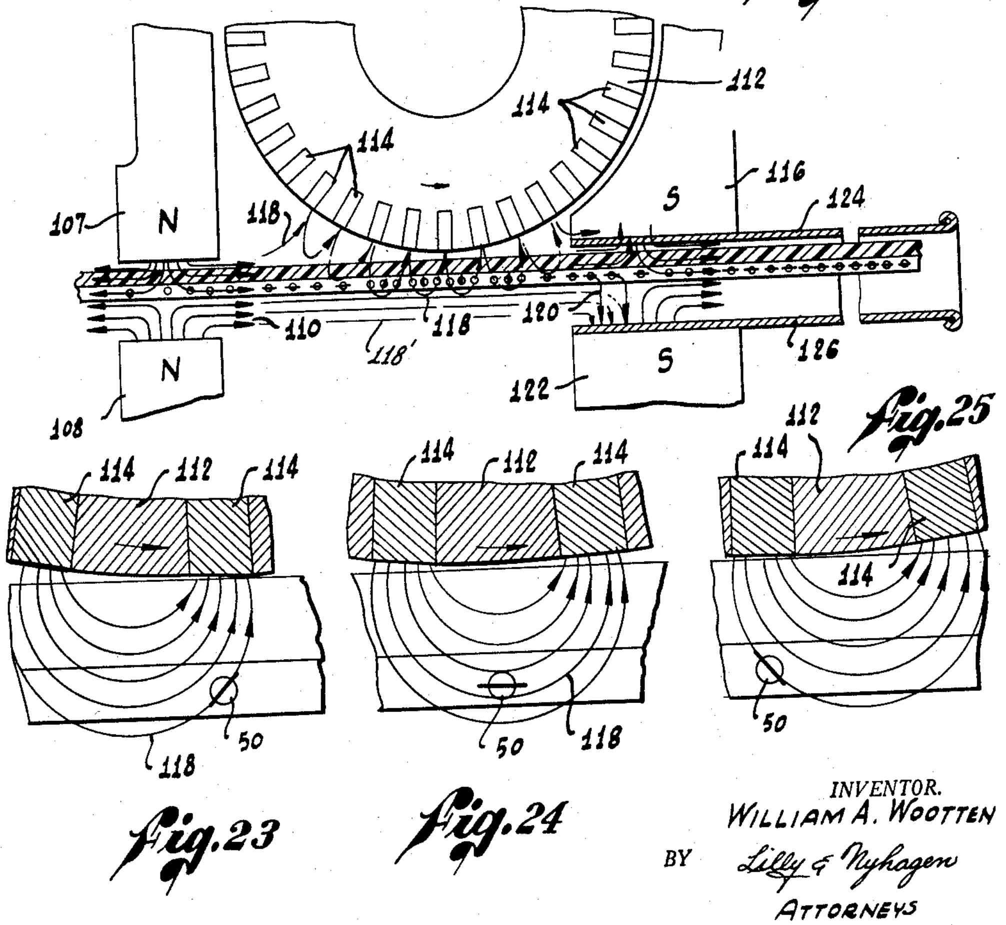
Fig. 22, Fig. 23, Fig. 24, Fig. 25
Fig. 23 Fig. 24
INVENTOR.
WILLIAM A. WOOTTEN
BY Lilly & Nyhagen
ATTORNEYS Jan. 7, 1964 W. A. WOOTTEN 3,117,065

METHOD AND APPARATUS FOR MAKING MAGNETIC RECORDING TAPE

Filed Sept. 2, 1959 7 Sheets-Sheet 5

INVENTOR.
WILLIAM A. WOOTTEN

BY Lilly & Nyhagen

ATTORNEYS

Jan. 7, 1964 W. A. WOOTTEN 3,117,065

METHOD AND APPARATUS FOR MAKING MAGNETIC RECORDING TAPE

Filed Sept. 2, 1959 7 Sheets-Sheet 6

INVENTOR.
WILLIAM A. WOOTTEN
BY Lilly & Nyhagen
ATTORNEYS

Jan. 7, 1964 W. A. WOOTTEN 3,117,065

METHOD AND APPARATUS FOR MAKING MAGNETIC RECORDING TAPE

Filed Sept. 2, 1959 7 Sheets-Sheet 7

INVENTOR.
WILLIAM A. WOOTTEN
BY Lilly & Nyhagen
ATTORNEYS 3,117,065
Patented Jan. 7, 1964

3,117,065

METHOD AND APPARATUS FOR MAKING MAGNETIC RECORDING TAPE

William A. Wootten, West Palos Verdes Estates, Calif., assignor to Magnetic Film and Tape Company, Inc., Los Angeles, Calif., a corporation of California Filed Sept. 2, 1959, Ser. No. 837,648
19 Claims. (Cl. 204—20)

This invention relates to the manufacture of ferromagnetic media such as magnetic recording media, and particularly to methods and apparatus for making magnetic recording tape and the like having improved physical and magnetic characteristics.

This application is a continuation-in-part of my applications, Serial No. 433,675, filed June 1, 1954 and entitled "Method For Treating Magnetic Tape," and Serial No. 589,726, filed June 6, 1956, and entitled "Method and Apparatus for Making Magnetic Tape," both now abandoned.

A primary illustrative application of this invention is concerned with the manufacture of magnetic recording tape. Magnetic recording tapes commonly comprise a flexible carrier web of non-magnetic material such as cellulose acetate. This carrier web is coated or impregnated with a ferromagnetic substance or ferromagnetic alloy which forms the actual magnetic recording medium of the tape.

In most magnetic recording tapes, this ferromagnetic substance or alloy is in the form of minute magnetically susceptible particles. These particles are of micron or sub-micron size and dispersed throughout a flexible, nonmangetic binder. Numerous different film-forming organic substance are employed as binders, such as plasticized cellulose esters or ethers, polyvinyl resins, acrylate resins, and others. The magnetically susceptible particles in the binder comprise various ferromagnetic materials or ferromagnetic alloys and may be acicular or nonacicular in shape. The composition comprising the nonmagnetic binder containing the dispersed magnetically susceptible particles is commonly referred to as a magnetic oxide.

According to one general existing practice of making magnetic recording tapes, a thin layer or coating of this magnetic oxide is applied to a flexible carrier web while in a viscous state. The oxide is then allowed to dry to form on the web a thin flexible oxide layer or film.

In magnetic recording operations, the tape is fed at a substantially constant rate through the magnetic recording field of a magnetic recording head. The electrical signal to be recorded, that is, the recording signal, is impressed on the coils of the head together with an A.C. or D.C. bias signal. The magnetic recording field is, therefore modulated in accordance with the modulation of the recording signal.

During movement of the tape past the recording head, the individual magnetically susceptible particles in the tape oxide become permanently magnetized in accordance with the intensity of the modulated recording field. When the tape is subsequently moved past a reproducing head, the lines of force in the magnetic fields created by the magnetized particles on the tape cut through the coils of the reproducing head and thereby induce a voltage in those coils.

The magnetic fields of the tape vary along the latter substantially in accordance with the variations in the original recording signal. Accordingly, the voltage induced in the reproducing head varies in approximately the same manner as the original recording signal.

The quality of a particular magnetic recording tape and therefore, the quality and fidelity of a magnetic recording made on the tape are dependent on various characteristics of the latter. The characteristics which are of prime importance in determining the quality of magnetic tape are signal to noise ratio, frequency response or sensitivity and especially frequency response at relatively high frequencies such as are involved in magnetic recording of video signals, and uniformity or consistency of output along the tape. The better the signal to noise ratio, and the more uniform the frequency response and output of the tape, the higher will be its quality as well as the quality and fidelity of a magnetic recording made thereon.

The above characteristics of the tape are, in turn, dependent on or determined by certain magnetic and physical properties of the oxide layer on the tape.

Thus, magnetic recording may be likened to any of the well known printing processes; that is, the ability to accurately print or magnetically record a maximum amount of information in a minimum space with maximum fidelity depends as much upon the quality and other characteristics of the medium on which the information is recorded as upon the characteristics of the means for recording the information. Thus, if an imperfection, such as a hole, exists in a piece of paper upon which information is printed, some portion of the printing will be distorted or not recorded. Similarly, if a defect, either physical or magnetic, exists in a magnetic recording tape, either the recording signal will not be completely recorded or the magnetic recording will be of low quality.

In the case of printing, if the hole or other defect in the paper is small in comparison with the dimensions of the characters being printed, the portion of the characters which are distorted or not reproduced will be insignificant. If, however the dimensions of the defects in the paper are substantial in comparison with the dimensions of the characters, the printed record may be illegible.

Similarly, in the case of magnetic recording, the greater the length of tape on which a given signal is recorded and/or the lower the frequency of the recording signal, the larger may be the defects in and the lower may be the sensitivity of the tape without seriously affecting its recording qualities. In the early development stages of magnetic recording, tape speeds were relatively high and the maximum frequencies of the recording signals were relatively low so that only substantial defects, such as so-called drop-outs, in the tape seriously impaired the quality and fidelity of the magnetic recording. With such high tape speeds, however, an excessive length of tape was necessary to magnetically record a given signal.

This factor of excessive tape length as well as advances in general in the fields in which magnetic recorders are used have required more and more information to be recorded in a given incremental length of tape, and, hence, higher quality recording tape. A better appreciation of this necessity of recording in a given length of tape a maximum amount of information may be gained from a comparison of the 15,000 cycles per second involved in the recording of sound and the four million cycles per second involved in television picture recording.

The primary physical requisites of high quality, high sensitivity recording tape having maximum signal/noise ratio, improved high frequency responses and improved uniformity of output are an extremely flat and smooth surface on the magnetic oxide of the tape and a minimum of imbedded foreign material, such as particles of dust and the like, in the oxide. Also, the wet oxide applied to the tape must be extremely accurately regulated or metered and uniformly spread so as to obtain an oxide layer having a predetermined thickness which is uniform in both transverse and linear directions. Finally, the ferromagnetic particles in the oxide should have maximum uniformity of dispersion in the binder of the oxide and the latter should possess maximum particle concentration.

That is, each incremental length of the oxide layer should contain approximately the same number of these particles and the particles should be compacted so that each incremental length of the oxide layer contains a maximum particle concentration.

The surface texture of the oxide layer has a pronounced effect on the characteristics of recording tape. That is, the rougher the surface of the oxide, the lower will be the signal to noise ratio of the tape, the less uniform will be its output, and the less favorable will be its frequency response, especially at the higher frequencies.

The oxide layer surfaces obtainable with existing techniques of applying the oxide to the carrier web are relatively rough. Resort is often had, therefore, to various mechanical operations for smoothing or polishing this surface. These operations, however, generally result in particles of foreign matter becoming imbedded in the oxide layer. This foreign matter creates so-called drop-outs, or magnetic voids, along the tape.

While these drop-outs or voids are undesirable at all frequencies, since they present portions in which signals cannot be recorded, they become extremely undesirable at higher frequencies. This is so, of course, owing to the approach of wave length at the higher frequencies to the physical dimensions of the voids. The greater the dimensions of the voids relative to the wave lengths of the recording signal, obviously, the greater will be the proportion of the recording signal which is unrecorded.

Drop-outs in the tape are especially serious in the magnetic recording of synchronizing pulses, for example. In many such cases, the duration of a pulse may be short in comparison to the effective dimensions of the drop-outs. Accordingly, one or more pulses may be completely unrecorded or so weakly recorded as to be undiscernible on play back.

Uniformity of oxide thickness in directions both laterally and longitudinally of the tape is also highly essential to its high quality, and especially to its consistency of output, improved frequency response and signal to noise ratio.

Of equal, if not more importance to a high quality, highly sensitive recording tape having optimum signal/noise ratio, consistency, and frequency response characteristics is maximum concentration and uniform dispersion of the ferromagnetic particles in the oxide layer over the length of the tape. Thus, a decrease in uniformity of dispersion and concentration of these particles results in an increased number of and more pronounced drop-outs, similar to and having the same undesirable effects as the drop-outs, previously discussed, caused by imbedded foreign matter in oxide. Also, the frequency response, especially high frequency response and consistency of output are adversely affected by decreased uniformity of particle dispersion and concentration.

The present invention provides novel methods and apparatus for making or treating magnetic recording tape, as well as various other ferromagnetic media, possessing appreciably improved oxide surface characteristics, more uniform particle dispersion and increased particle concentration, as well as a minimum of imbedded foreign matter. Magnetic recording tapes produced by the present methods and apparatus therefore exhibit improved signal/noise ratios, consistency of outputs, high frequency response and improved magnetic recording characteristics in general. It will also become clear as the description proceeds that with the present methods and apparatus recording tapes may be produced at higher rates, with more compact equipment, and with more reliable and consistent results than heretofore possible.

The foregoing discussion has dealt primarily with the physical properties essential to high quality, highly sensitive recording tape. A second consideration in the manufacture of such improved tape involves its magnetic properties and particle orientation.

It is known that the ferromagnetic particles employed in magnetic oxides of the character under discussion are magnetically anisotropic in character. That is, the particles exhibit maximum susceptibility or sensitivity to an external magnetic field along a specific plane or axis. This axis is commonly referred to as the anisotropic axis or axis of easy magnetization. At right angles to this axis, the magnetization of the particles requires much greater strength in the external field.

Thus, the individual magnetically anisotropic particles in the tape oxide are most readily magnetized by a recording field when they present their angles of easy magnetization to the field, that is, when they are oriented with their anisotropic axes paralleling the force lines of the recording field. The recording tape as a whole, therefore, possesses maximum sensitivity, improved high frequency response, increased consistency of output, and improved magnetic recording characteristics in general when a maximum number of the anisotropic particles in the oxide are unidirectionally oriented in this fashion, relative to the recording field. Moreover, because of this magnetic anisotropy of the particles they possess magnetic moments. That is, if free to move, the particles tend to be rotated by an applied field to positions wherein their anisotropic axes parallel the force lines in the field.

The recording head in high frequency magnetic recorders is generally ring-shaped and the magnetic lines of force in the recording field of the head extend generally longitudinally of and parallel to the direction of movement of the tape. In general, optimum recording characteristics of magnetic tape for use with such longitudinal recording heads are achieved by having the anisotropic particles in the tape oxide oriented with their anisotropic axes extending longitudinally of the tape so as to parallel the force lines of the recording field. This orientation of the particles is known as, and hereinafter referred to as, longitudinal orientation.

According to another magnetic recording technique, the poles of the recording head are located at opposite sides of the recording tape so that the lines of force in the magnetic field of the head extend normal to the plane of the tape. Optimum recording characteristics of recording tape for use with this latter type of recording head are achieved by having the magnetic particles oriented with their anisotropic axes extending normal to the plane of the tape so as to parallel the force lines in the recording field. This latter orientation of the particles is known as, and hereinafter referred to as, perpendicular orientation. Under normal circumstances, this latter perpendicular recording technique does not achieve the high frequency response inherent in longitudinal recording techniques but has other distinct advantages which render it highly advantageous in certain applications such as computer memory systems.

Finally, according to recent developments in the field of magnetic recording of video signals, the recording head moves across the tape simultaneously with longitudinal movement of the latter so that recording is accomplished along direction lines extending transverse of the tape. This type of magnetic recording is most effective when the anisotropic particles in the tape oxide are unidirectionally orientated with their axes extending in the plane of and transversely of the length of the tape and paralleling the force lines in the field of the recording head. In most video recording equipment these force lines extend generally normal to the length of the tape.

Various methods and apparatus are in existence for orienting, to a degree, the anisotropic particles in the magnetic oxide of magnetic recording tape and other magnetic recording media. Insofar as I am aware, these existing methods and apparatus involve the application of a constant, generally unidirectional magnetic field to the oxide while the latter is still in a viscous state. The constant field is so directed that its lines of force extend generally in a predetermined direction relative to the carrier web. This direction corresponds to the desired direction of orientation of the anisotropic particles.

Owing to the magnetic moments possessed by the anisotropic particles, the latter tend to align themselves under the influence of the field with their anisotropic axes paralleling the field. The viscosity of the oxide is controlled to enable this physical aligning movement of the particles.

Generally, the existing methods and apparatus of this nature require the oxide to be dried in the orienting field in order to preserve the degree of unidirectional orientation which is achieved. This requirement is undesirable since it restricts the rate at which the tape may be fed through the field and hence the rate of production of the tape. Apparatus for accomplishing these prior methods are also relatively large and costly.

A more serious deficiency of these existing methods and apparatus, however, is that they apparently fail to achieve optimum unidirectional orientation of the anisotropic particles. It is thought that the reason for this is that the viscosity of the oxide, although controlled as previously noted, and various other factors inhibit the alignment of the anisotropic particles with the force lines of the consultant orienting field. The particles are, of course, oriented in random fashion prior to entrance into the orienting field.

For reasons discussed below, the intensity of this field is necessarily limited. Apparently the maximum field strength which may be employed is not sufficient to accomplish maximum unidirectional orientation of the particles against the forces, such as result from the viscosity of the oxide, which inhibit such orientation.

The intensity of the orienting fields in the prior methods and apparatus are limited, as above mentioned, because of the tendency of the oxide to be magnetically attracted toward the poles which establish the fields. Above a certain field strength, appreciably less than that necessary for optimum orientation, this force of attraction causes the surface of the oxide to become striated or otherwise deviated from a desired flat, smooth condition. Striations and other surface irregularities adversely affect the quality and recording characteristics of the tape as was previously noted.

To eliminate these striations and irregularities resort is generally had to various polishing techniques with the resultant undesirable effects previously discussed. The existing methods and apparatus make no provision for magnetic spreading of the oxide into a uniform, smooth surfaced layer so as to avoid the necessity of mechanical polishing operations. Also, only certain directions of orientation may be approached by employmeent of the existing methods and apparatus.

In the light of the foregoing discussion, a broad object of this invention may be stated as being the provision of methods and apparatus for making high quality, highly sensitive magnetic recording tape and other improved ferromagnetic media.

Another broad object of the invention is the provision of methods and apparatus for making magnetic recording tape and the like which avoid the above noted and other deficiencies of existing methods and apparatus for this purpose.

A more specific object of the invention is the provision of methods and apparatus for making magnetic recording tape and the like having an oxide layer possessing improved surface characteristics, of more uniform thickness laterally and longitudinally of the tape, and having a minimum of imbedded foreign material.

Another object is the provision of methods and apparatus for making magnetic recording tape and the like wherein the concentration of anisotropic particles in the oxide layer of the tape per unit length of the tape and the uniformity of dispersion of the particles in the oxide over the length of the tape are increased.

Yet another object is the provision of methods and apparatus for making magnetic recording tape and the like wherein a higher degree of unidirectional orientation of the anisotropic particles in the tape oxide is achieved than has heretofore been possible to achieve.

Still another object is the provision of methods and apparatus for making magnetic recording tape having an oxide layer wherein the anisotropic particles may be unidirectionally oriented in predetermined angular relationship with the tape most compatible with the direction of a particular recording field.

A further object is the provision of methods and apparatus for making highly sensitive magnetic recording tape and the like wherein the anisotropic particles in the tape oxide are perpendicularly orientated to present their angle of optimum magnetization to perpendicular recording fields.

A still further object is the provision of methods and apparatus for making highly sensitive magnetic recording tape and the like wherein the individual anisotropic particles in the tape oxide are longitudinally orientated to present their angle of optimum magnetization to longitudinal recording fields.

Yet a further object is the provision of methods and apparatus for making highly sensitive magnetic recording tape and the like wherein the individual anisotropic particles in the tape oxide are transversely orientated to present their angle of optimum magnetization to transverse, video recording fields.

Another object is the provision of methods and apparatus for making magnetic recording tape and the like possessing an improved signal/noise ratio, improved uniformity or consistency of output, improved sensitivity and frequency response especially at relatively high frequencies, and improved magnetic recording and reproducing characteristics in general.

A further object of the invention is the provision of novel methods and apparatus for applying ferromagnetic oxide layers to carriers for making magnetic recording tapes and other ferromagnetic media.

Other objects of the invention reside in the provision of methods and apparatus of the character described which are relatively simple in application, construction and operation, do not require the oxide to be dried in the orienting field so as to be capable of being run at increased speeds, adaptable to the production of numerous different types of ferromagnetic media, and, in general, especially well suited to accomplish their intended ends.

Briefly, the primary illustrative method of this invention, relating to the manufacture of magnetic recording tape, involves the application of a controlled magnetic field to the tape while its oxide is still in a viscous state. The anisotropic particles in the tape are thus relatively free to move under the influence of the field and align their anisotropic axes with the field. In contrast to the constant or static "orienting" field employed in existing methods of this nature of which I am aware, the orienting magnetic field of this invention involves both constant or unidirectional and directionally and/or intensity modulated components.

As will become clear as the description proceeds, these two components may be derived from a common field source. In this case the lines of force in the field are directed to extend in the general direction, relative to the tape, in which final particle orientation is desired. These force lines are modulated to a degree in intensity and/or direction relative to the tape.

In the alternative, the controlled orienting field may comprise two or more separate fields to which the oxide is successively subjected. Certain of these fields are modulated in intensity and/or direction relative to the tape while possessing a general unidirectional characteristic relative to the tape consistent with the final particle orientation desired. Others of these fields are constant and directed in accordance with the desired particle orientation.

In another alternative, the controlled, orienting field may comprise two or more separate fields which are superimposed so as to be simultaneously applied to the same portion of the oxide. One or more of these fields are modulated in direction and/or intensity relative to the tape while possessing a general unidirectional characteristic relative to the tape consistent with the final particle orientation desired. Others of the applied fields are constant and directed in accordance with the desired particle orientation.

Owing to the submicroscopic size of the anisotropic particles employed in magnetic oxides, it is impossible to accurately state the exact phenomena which occur when the oxide is subjected to the controlled magnetic field or fields of this invention. It is theorized, however, that the modulated components of the applied field or fields tend to physically rock or joggle the individual anisotropic particles in the binder of the oxide while imparting a semblance of unidirectional orientation to the particles.

The forces, previously noted, which tend to inhibit alignment of the particles with the field, such as are due to the viscosity of the oxide, appear to be overcome to an appreciable extent by this joggling of the particles so that the latter may more readily align themselves with the constant, unidirectional components of the applied field. An appreciably higher degree of unidirectional orientation of the particles, either longitudinal, perpendicular or transverse, depending on the direction of the applied field, is thereby achieved.

Modulation of the applied field also induces spreading of the oxide into a layer of more uniform thickness, and results in an oxide layer having an appreciably smoother surface, increased particle concentration per unit length of the tape, and more uniform dispersion of the particles over the length of the tape.

The invention also provides auxiliary magnetic means for inducing uniform spreading of the oxide. Owing to the smoothness of the oxide layer without resort to calendering or polishing operations, foreign matter in the oxide layer is appreciably reduced, and, in fact, is substantially eliminated.

An additional, highly important advantage stemming from modulation of the field as briefly described above is that a field of increased intensity may be applied to the tape without causing striations or other irregularities in the surface of the oxide. This increased field strength aids in achieving more effective unidirectional orientation of the anisotropic particles. Further, the anisotropic particles in the oxide are apparently magnetized more to saturation and became, in effect, interlocked in their unidirectionally oriented positions. They, therefore, tend to retain their unidirectional orientation for a longer period of time after emergence from the applied field than in existing methods. Thus, it has been found that with the present method, it is not necessary to dry the oxide in the applied field to preserve the unidirectional orientation of the anisotropic particles. The present method may, therefore, be run at substantially higher rates and may be practiced with smaller, less complex and more inexpensive apparatus.

In view of the preliminary discussion concerning the physical and magnetic properties essential to high quality, highly sensitive recordng tape, it will be evident from what has just been said that the present method results in recording tape possessing improved recording characteristics. In particular, recording tape made by the present process has an improved signal/noise ratio, improved high frequency response, and more uniform output. Also successively made tapes are more consistent in their recording and reproducing characteristics than has been heretofore possible to achieve.

The invention also provides a novel method of applying, by magnetic attraction, an accurately controlled or metered quantity of oxide to the carrier web of the tape. This assures a more uniform oxide layer.

Briefly, the primary illustrative embodiments of the present apparatus for carrying out the methods outlined above, comprise an applicator assembly for applying wet oxide to a strip or web of suitable material such as cellulose acetate and an orientation assembly for unidirectionally orienting the anisotropic particles contained in the oxide.

The illustrative applicator assembly consists of a grooved applicator roller onto which is directed a jet of wet oxide. The web is fed over this roller and is pressed against its periphery by a resilient pressure roller enclosing a magnet assembly which draws the oxide from the grooves in the applicator roller onto the tape as well as initially orients the particles in the oxide. The dimensions of the grooves are accurately controlled so as to achieve accurate metering of the oxide applied to the web.

The orientation assemblies in the illustrative apparatus comprise permanent magnet structures arranged to establish one or more generally unidirectional magnetic fields, the force lines of which have a predetermined general direction relative to the web depending on the final particle orientation desired. The web is fed through these fields, portions of which are modulated either by magnetically permeable rotors in direction, or intensity, or both, to oscillate or joggle the particles in the oxide of the tape. The applied field or fields also have constant unidirectional components directed to achieve the final desired unidirectional longitudinal, perpendicular, or transverse orientation of the particles, as the case may be.

Fixed magnets preceding the orientation assemblies accomplish spreading of the oxide into a uniform layer by virtue of the magnetic forces exerted on the particles in the oxide by these latter magnets.

Also disclosed are certain diverse applications of the invention to the making of magnetic recording tape and other ferromagnetic media such as magnetic memory drums, and transformer cores by spraying, electroplating, and sputtering techniques.

A better understanding of the invention may be had from the following detailed description taken in conjunction with the annexed drawings, wherein.

Figures 26, 27, 28, 29, 30, 31:
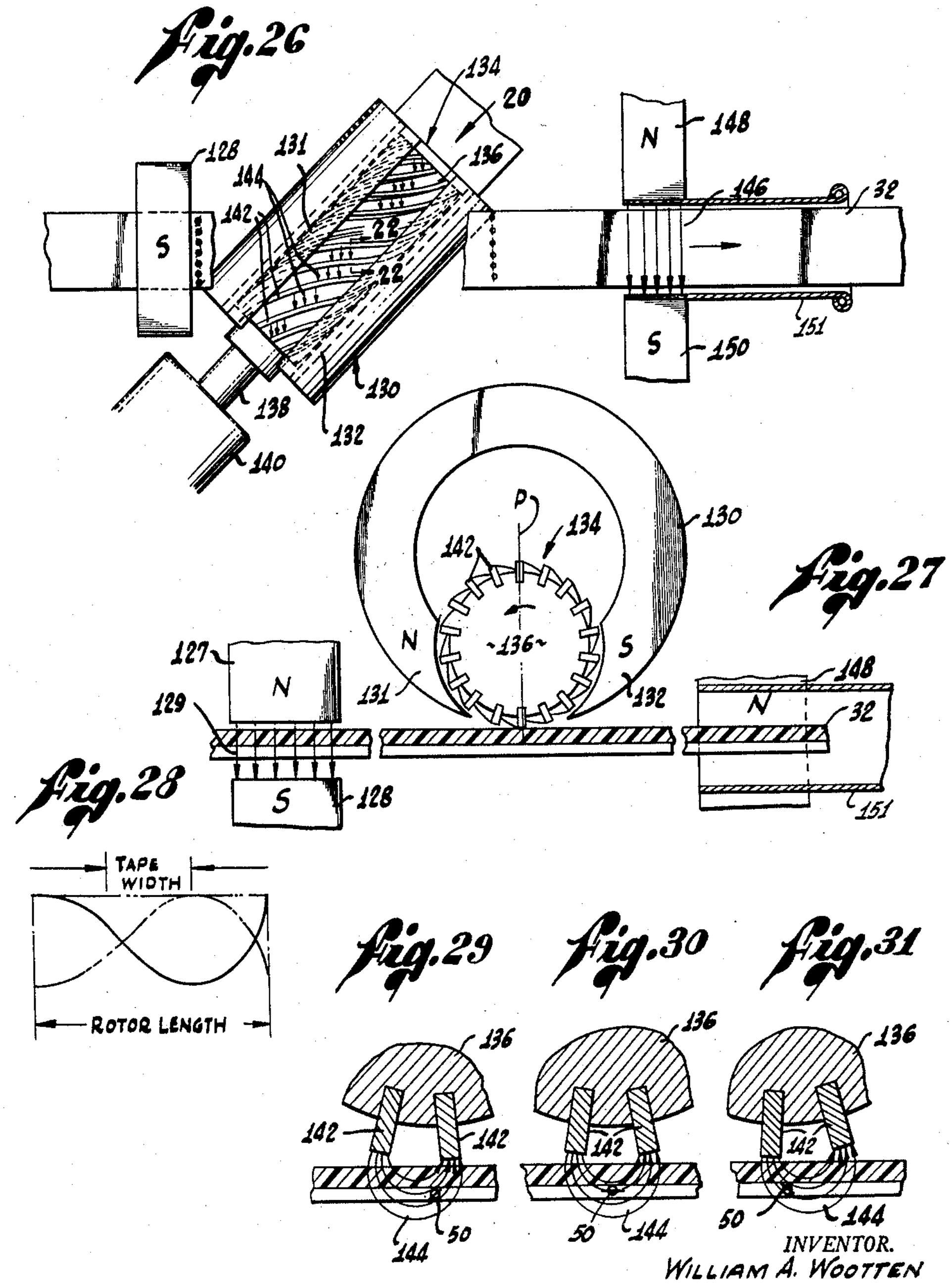
Figures 32, 33, 34, 37:
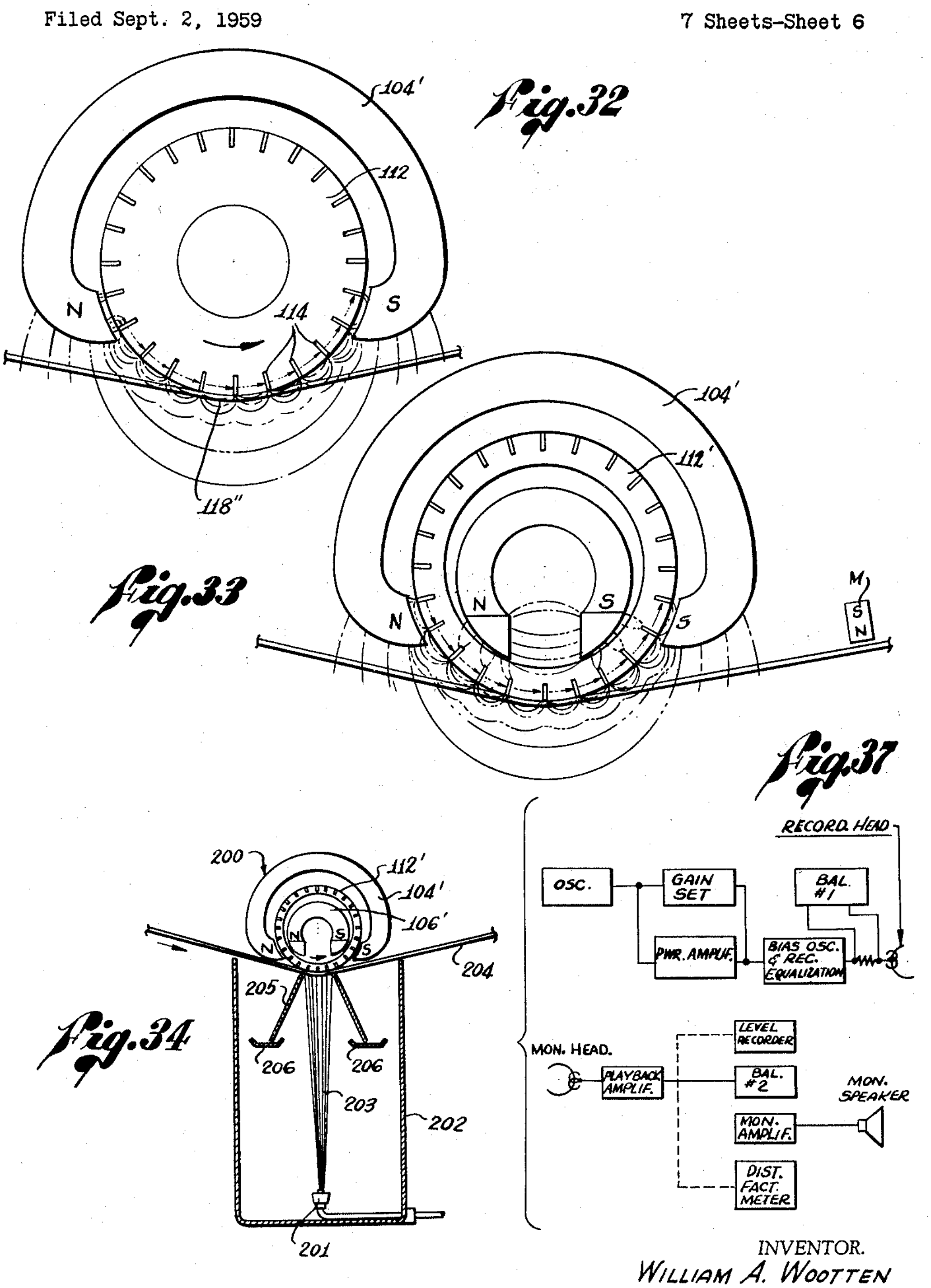
Figure 35:
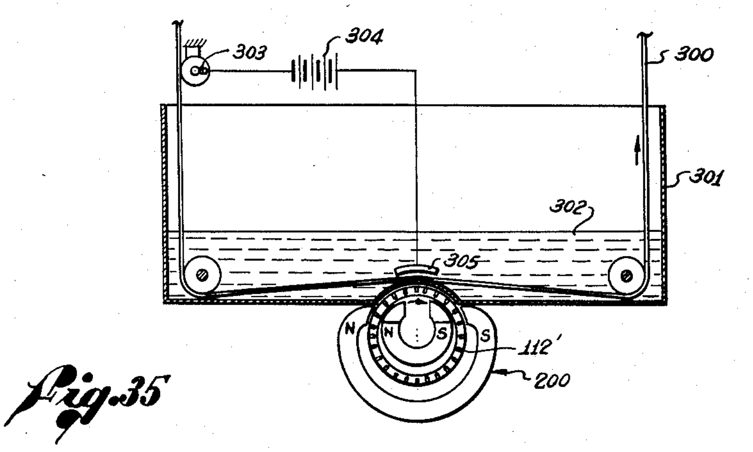
Figure 36:
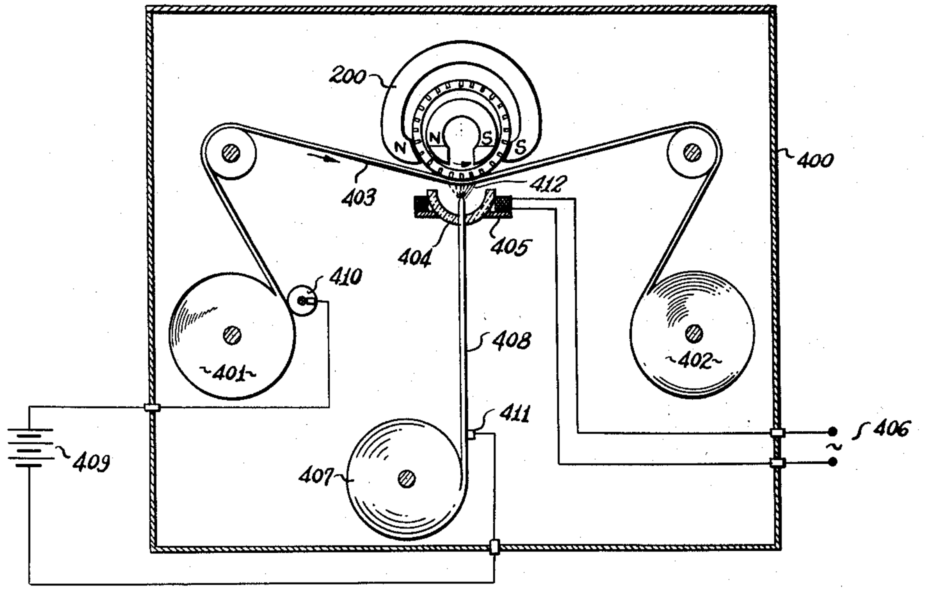

FIGURE 21 diagrammatically illustrates a modified form of the present invention for producing magnetic recording tape wherein the individual anisotropic particles are longitudinally orientated;

FIGURE 22 is an enlarged partial view of a portion of the apparatus in FIGURE 21;

FIGURES 23, 24 and 25 illustrate the manner in which the apparatus of FIGURE 21 accomplishes modulation of the magnetic field to joggle the anisotropic particles in the magnetic oxide;

FIGURE 26 illustrates a further modified form of the invention for producing magnetic recording tape wherein the anisotropic particles are transversely orientated;

FIGURE 27 is an enlarged view of the apparatus of FIGURE 26, rotated to normal position, as seen in the direction indicated by the arrow on line 27 in that figure;

FIGURE 28 is a diagrammatic view illustrating certain actions which occur in the operation of the apparatus of FIGURE 26;

FIGURES 29–31 are enlarged sections taken along line 29—29 in FIGURE 26 illustrating the manner in which the apparatus of FIGURE 26 accomplishes modulation of the magnetic field to joggle the anisotropic particles in the tape oxide;

FIGURE 32 is a slightly modified form of the apparatus illustrated in FIGURE 21;

FIGURE 33 is a further modified form of the present apparatus;

FIGURES 34–36 illustrate the application of the present methods and apparatus to spraying, electro-deposition and sputtering processes of coating tapes; and FIGURE 37 illustrates the test set up employed in the comparison tests referenced herein.

Figures 1, 2, 3, 4, 5:
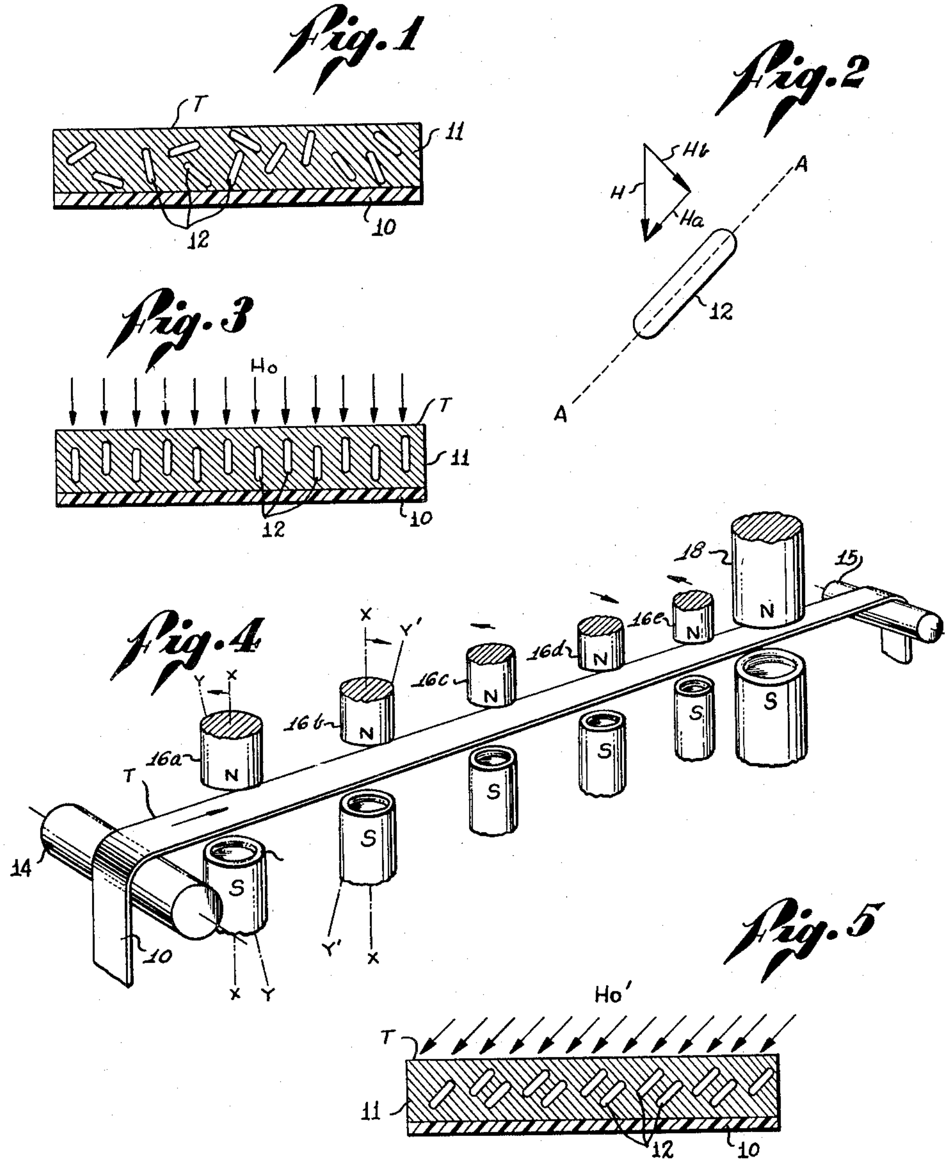
FIGURE 1 is a schematic diagram in cross-section of a magnetic tape, greatly exaggerated for purposes of clarity.
FIGURE 2 is an enlarged view of one of the magnetic sensitive or anisotropic particles incorporated in the tape of FIGURE 1.
FIGURE 3 is a view similar to FIGURE 1 shown the effect of applying a uniform magnetic field to the tape prior to drying of the adhesive coating on the tape during its manufacture.
FIGURE 4 is a diagrammatic perspective view of one means for carrying out the present method for accomplishing perpendicular orientation of the anisotropic particles.
FIGURE 5 is another view similar to FIGURE 3 showing the effect of applying a magnetic field directed at an angle to the tape.

Referring to FIGURE 1, there is shown in longitudinal cross-section a short section of a conventional magnetic recording tape T. This tape comprises a base or web 10 of flexible, non-magnetic material, and a coating of adhesive or binder 11 incorporating magnetic sensitive, anisotropic particles 12. The particles 12 usually consist of iron oxide or other ferromagnetic substances and may be elongated or acicular in shape, as shown, or non-acicular. These particles are on the order of one micron in size. As shown, the particles are randomly oriented.

In FIGURE 2 one of the particles 12 is shown greatly enlarged. In accordance with the anisotropic magnetic sensitivity theory, this particle exhibits maximum sensitivity to a magnetic field along a specific axis such as its longitudinal axis A—A. At right angles to this axis, commonly referred to as its magnetic anisotropic axis, the magnetic characteristics of the particle are virtually unaffected by an applied magnetic field. Thus, if a magnetic recording field is directed at an angle to the A—A axis, substantially only that component of the field parallel to the A—A axis will magnetize or be recorded by the particle. In FIGURE 2 the effective component of the magnetic recording field H is designated H*a* while the ineffective component normal to the A—A axis is designated H*b*. Thus, only a part of the signal strength represented by the H vector is recorded or retained by the particle 12.

The particles in the tape T are fixed and cannot be shifted in direction once the binder 11 is dry. It will be appreciated at once, therefore, that the random distribution or orientation of the particles 12 in the tape T as shown in FIG. 1 results in only those particles with their longitudinal or anisotropic axes oriented substantially in the direction of or paralleling the applied recording field having maximum effectiveness in recording signals. The degree of magnetization of each of the particles thus depends on its orientation as well as on the strength of the recording field. It is to be noted that the particles whose magnetic sensitive or anisotropic axes are at an acute angle to the recording field will record the component of the field parallel thereto, and that the signal strength of this component is diminished in proportion to the cosine of the angle between the anisotropic axis A—A and the recording field vector H.

Accordingly, over a unit distance of tape, there will not be a sharp cut-off or drop in signal strength at the beginning and end of this unit distance during playback in view of these angulated particles. In other words, the elongated nature of the particles prevents the realization of a clean cut-off, unless the particles are all oriented in like directions. Complete random orientation of the particles, as existed in early tapes, also results in a poor signal/noise ratio, non-uniform output, poor frequency response, pronounced drop-outs, and poor recording and reproducing characteristics in general, as previously noted. Some improvement may be effected by making the particles smaller in size and spherical in shape, but there would still result the undesirable diminished signal strength of particles whose magnetic sensitive axes are angularly oriented.

As preliminarily discussed, processes and apparatus have been proposed for achieving a degree of orientation of the anisotropic particles in the tape oxide by passing the tape through a constant or uniform magnetic field while the oxide is still wet.

FIGURE 3 illustrates the effect of applying a uniform perpendicular magnetic field to the tape prior to the drying step in its manufacture. Just after the coating or oxide 11 has been applied, the binder thereof is in a semi-liquid state, and the particles 12 are relatively free to move. If a uniform magnetic field H*o* is applied normally to the tape surface, as in perpendicular orienting techniques, the particles tend to rotate, because of their magnetic moments, to align their magnetic sensitive or anisotropic axes with the field, as shown. After exposure to the field, the tape is dried in any conventional manner, resulting in permanent setting or fixing of the particles in their reoriented state. The tape is thereafter degaussed.

If the tape is now employed for recording magnetic signals, each of the particles will be utilized to an increased extent. The recording characteristics of the tape are thereby improved, as preliminarily discussed.

As was earlier noted, however, the maximum intensity of the field H*o* which may be employed without causing striations and other irregularities in the surface of the oxide is limited to a value less than that necessary to achieve the degree of orientation illustrated in FIGURE 3. I have found that a higher field strength may be used, the orienting process accelerated, a higher degree of unidirectional orientation, approaching that illustrated in FIGURE 3, achieved, and the physical and magnetic properties, in general, of magnetic recording tape appreciably improved by subjecting the oxide while wet to a magnetic field having both constant or uniform and intensity and/or directionally modulated components.

As mentioned earlier, the exact manner in which modulation of the field accomplishes a higher degree of unidirectional orientation of the anisotropic particles in the oxide is not known. It is thought, however, that modulation of the field tends to joggle or vibrate the particles in the binder of the oxide. Their rotation into alignment with the constant, unidirectional components of the field appears, thereby, to be promoted. The surface characteristics, uniformity of particle dispersion and particle concentration per unit length of the oxide also appear to be enhanced. These effects of modulation will be hereinafter more fully discussed.

The present method, as well as one form of apparatus for carrying out that method to achieve perpendicular particle orientation, are schematically illustrated in FIGURE 4. After the oxide 11 has been applied to the base 10 of the tape, it is guided for movement in the direction indicated by means of a pair of rollers 14 and 15 through a series of permanent magnets *16a, 16b, 16c, 16d* and *16e*. The north and south poles, N, S, of each of these magnets straddle the tape to direct their fields generally normally therethrough along the X—X axes as shown. The magnetic field of each magnet should have a strength of the order of 2,000 gauss. The edge tips 17 on each magnet insure a more uniform field.

The jogging or vibrating of the particles 12 to facilitate their alignment with the generally perpendicular fields of the magnets 16 may be accomplished by oscillating each of the magnets *16a* to *16e* through a small arc of from 30 to 50 degrees to modulate the direction of each magnetic field relative to the tape. For example, the magnet *16a* may be rocked about the longitudinal axis of the tape T so that the magnetic lines of force of that magnet are correspondingly angularly rocked or vibrated in direction relative to tape 10 between the limits of the X—X and the Y—Y axes. The next magnet *16b* in the series is simultaneously rocked 180 degrees out of phase with magnet *16a*, to modulate its magnetic field between the limits of the X—X and the Y′—Y′ axes. Similarly, the remaining magnets are alternately oscillated. The changing directions of the magnetic lines of force relative to tape 10 serve to oscillate the particles 12 in the tape oxide about axes transverse to their anisotropic axes, thereby facilitating the "working" of the particles toward a perpendicular orientation. In this connection, it is though preferable to progressively reduce the arc of oscillation of the magnets so that when the tape passes through the last moving magnet of the series, very little oscillation of the particles occurs and the latter are substantially perpendicularly oriented.

After the tape has passed through the last moving magnet *16e*, it is passed through a large stationary magnet 18 which directs a fixed field of the order of 4,000 gauss through the tape to fix the particles in their perpendicular orientation. Subsequent drying of the oxide maintains the orientation of the particles.

FIGURE 5 illustrates the effect of applying a uniform magnetic field Ho′ at an angle to the tape when the oxide is in a viscous state. As shown, the particles tend to align themselves with their anisotropic axes paralleling the magnetic field Ho′. In some types of recording heads wherein the magnetic field enters the tape at an angle, presetting of the particles to such angle will insure maximum sensitivity.

After the oxide has been dried, and the particles 12 set in desired orientation (perpendicular orientation in the illustrative tape of FIGURE 3), the entire tape is degaussed. This degaussing operation merely demagnetizes the particles 12 and does not alter their acquired unidirectional orientation.

Briefly, then, the present method, as it relates to the production of magnetic tape, involves the application of wet magnetic oxide to a carrier web, passage of the web and oxide thereon, while the latter is still in a viscous state, through a directionally vibrating magnetic field. The angle of directional vibration of this magnetic force field is consistent with, or includes, the direction of final particle orientation desired. Finally, the oxide is dried to fix the anisotropic particles of the oxide in their acquired unidirectionally orientated positions.

As mentioned, FIGURES 3 and 4 illustrate the present method and apparatus as they apply to the manufacture of perpendicularly oriented tape suitable for use with perpendicular recording fields. The following description, and additional figures of the drawings, disclose the present method, and apparatus for the practice thereof, modified to achieve perpendicular as well as other directions of particle orientation. The ensuing discussion will also discuss in somewhat greater detail the phenomena which are presumed to occur during application of the modulated field and reiterate the beneficial results achieved.

In these additional figures, as previously noted, FIGURES 6–20 illustrate a present modified method and apparatus for achieving perpendicular particles orientation. FIGURES 21–25 illustrate a further modified method and apparatus for producing longitudinal particle orientation. FIGURES 26–31 illustrate a still further method and apparatus of the invention for making magnetic recording tape possessing transverse orientation as is most compatible with video recording systems.

Figures 6, 7, 8, 9, 10, 11, 12, 13, 14:
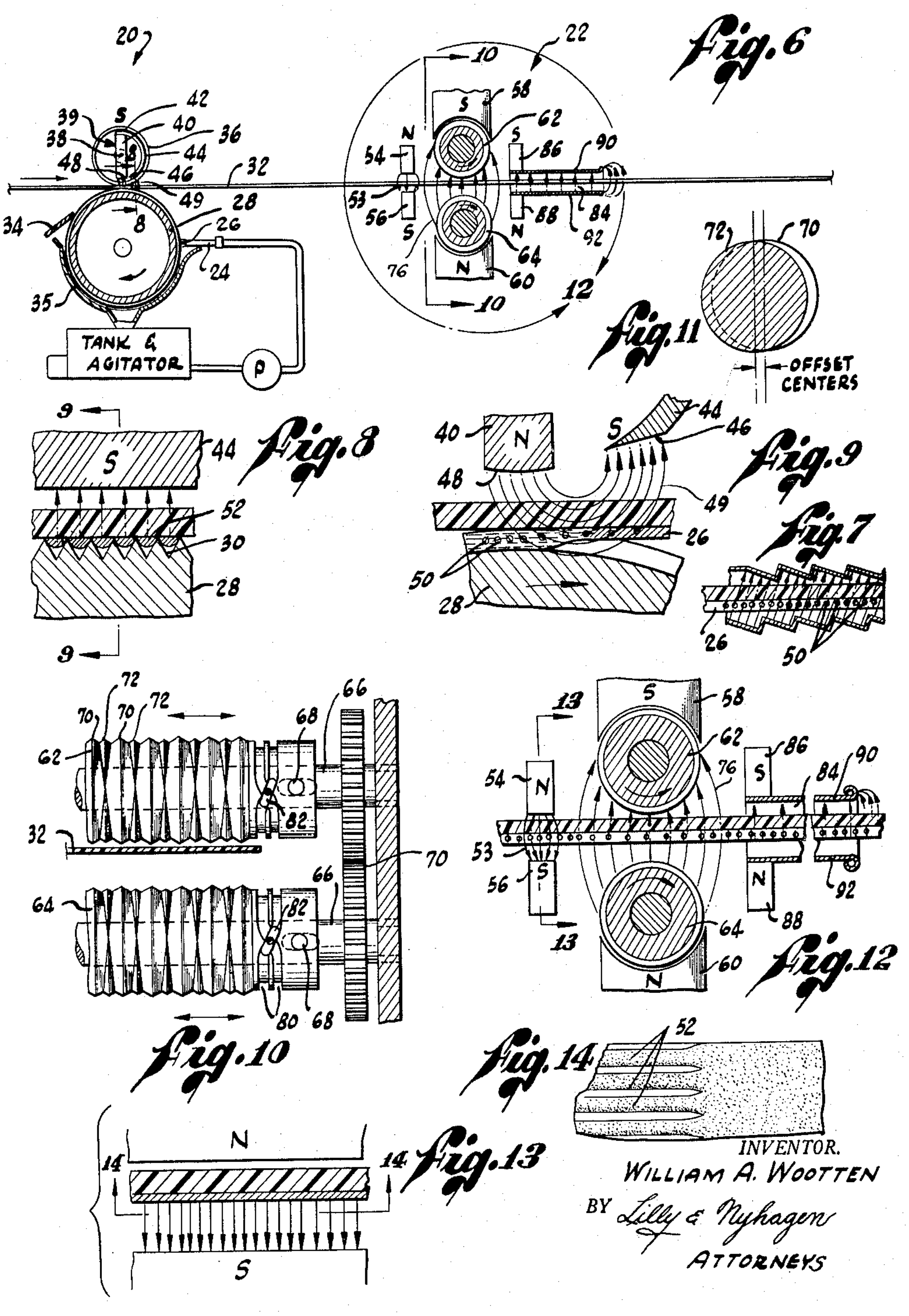
FIGURE 6 illustrates in diagrammatic fashion another form of the present apparatus for producing magnetic recording tape wherein the anisotropic particles in the tape oxide are perpendicularly orientated.
FIGURE 7 illustrates a modification to the apparatus of FIGURE 6.
FIGURE 8 is an enlarged section taken along line 8—8 of FIGURE 6 illustrating the manner of application of the magnetic oxide to the tape in the apparatus of FIGURE 6.
FIGURE 9 is a section taken along line 9—9 of FIGURE 8.
FIGURE 10 is an enlarged view, partially broken away, looking in the direction indicated by the arrows on line 10—10 in FIGURE 6 and illustrating the mechanism for accomplishing modulation of the magnetic field to joggle the particles in the oxide layer of the tape.
FIGURE 11 illustrates certain features of magnetic field modulating rotors embodied in the mechanism of FIGURE 10.
FIGURE 12 is an enlarged showing of the portion of the apparatus indicated by the line 12 in FIGURE 6.
FIGURE 13 is a section taken along line 13—13 of FIGURE 12.
FIGURE 14 is an enlarged detailed showing of the magnetic recording tape as viewed in the direction indicated by the arrows on line 14—14 in FIGURE 13.

The apparatus shown in FIGURE 6 comprises the two preliminarily mentioned, basic assemblies, namely, an applicator assembly 20 for applying a layer of magnetic oxide to a web or tape and an orientation assembly 22 for treating the tape to accomplish perpendicular orientation of the anisotropic particles contained in the oxide. The applicator assembly 20 comprises a nozzle 24, which is elongated in a direction normal to the plane of the paper, for directing a jet 26 of magnetic oxide in its viscous state onto an applicator roller 28 along the entire length of the latter. Roller 28 is driven in rotation in the direction indicated, and as shown most clearly in FIGURE 8, the applicator roller 28 is formed with a series of peripheral grooves 30 of V-shaped cross-section and extending circumferentially about the roller. The grooves 30 have, for clarity, been greatly exaggerated in FIGURE 8, the grooves in the actual apparatus being on the order of .020 inch wide and .035 inch deep with included apex angles of 30 degrees so that, for example, 500 of these grooves lie within the width of a 10 inch magnetic oxide strip. During rotation of the roller 28 past jet 26 the grooves 30 become filled with oxide which adheres to the roller as it turns so as to be carried to the tape 32. A doctor blade 34 removes excess oxide from the roller, the excess being collected in a trough 35 and recirculated to the nozzle 24.

Tape 32, which as previously described, comprises a web of suitable material, such as cellulose acetate, is fed under a pressure roller 36 which presses the web firmly against the periphery of the applicator roller 28. This pressure roller comprises a suitable resilient outer sleeve and is supported for rotation about an axis 38.

Enclosed within the pressure roller 36 is a stationary oxide-pickup magnet assembly 39 comprising an elongate permanent bar magnet 40 extending the length of the applicator roller 28. Bar magnet 40 is supported within the pressure roller 36 for angular adjustment about the axis 38 and has an upper longitudinal edge 42 forming the south pole of the magnet. Fixed along edge 42 of the magnet is one edge of a generally semi-cylindrical sleeve 44 of magnetically permeable material. This sleeve 44, which, in effect, forms a pole shoe, has a length equal to that of the bar magnet 40 and has its lower edge 46 tapered, as shown, and spaced slightly from the lower longitudinal edge 48 of the magnet 40 which forms the north pole of the latter. Thus, the tapered edge 46 of the sleeve 44 forms a south pole face between which and the north pole 48 exists a magnetic field 49.

The above described magnet assembly while being angularly adjustable within the pressure roller 36 is supported on independent bearings so as to remain stationary during turning of the pressure roller. Accordingly, when the tape 32 is fed through the applicator assembly 20 in the direction indicated, it will pass through the magnetic field 49.

Referring now to FIGURES 8 and 9, it will be seen that as the applicator roller 28 turns, the magnetic oxide 26 is drawn out of the roller grooves 30 and deposited on the underside of the tape 32 by virtue of the magnetic attraction between the anisotropic particles 50 in the oxide 26 and the magnet assembly 39. By accurately controlling the dimensions of the grooves 30 so that the latter will contain a precise amount of oxide, an accurately metered amount of oxide may be applied to the tape. During operation of the apparatus, tape 32 is continuously fed between the magnet assembly 39 and applicator roller 28 and the latter is continuously rotated with a peripheral speed equal to the tape speed so that there is applied to the tape a series of longitudinally extending beads 52 of oxide, as may be seen most clearly in FIGURES 8 and 14.

In addition to aiding in the application of the oxide to the tape, the magnetic field 49 establishes an initial orientation of the anisotropic particles in the oxide. Thus, as will be observed in FIGURE 9, the anisotropic axes of the particles 50 in the oxide, prior to their entrance into the magnetic field 49, have random orientation. During passage of the oxide through the field 49 while on the applicator roller 28 and also after adherence to the tape, however, the particles 50 in the oxide tend to align themselves with their anisotropic axes paralleling the lines of force in the magnetic field 49 so that upon exit of the tape from the field, the particles have some degreè of unidirectional orientation, as shown.

In the run of tape between the applicator assembly 20 and the orientation assembly 22, the oxide layer on the tape appears somewhat as illustrated in FIGURE 14. During movement of the tape between these two assemblies, obviously, the oxide being in its viscous state tends to flow so that the ribs 52 of oxide will not maintain their pronounced configuration shown in FIGURE 8, but will tend to flow into a layer of more uniform thickness. As indicated in FIGURE 14, however, the oxide layer will possess a visibly stripped appearance and its surface will not be as smooth as is necessary for high quality, highly sensitive magnetic recording tape.

The invention proposes to accomplish additional spreading of the oxide into a layer of uniform thickness by feeding the tape through a relatively intense magnetic field 53 between the north and south poles of a pair of permanent magnets 54 and 56 which extend the width of the tape. This field has an intensity on the order of 1200 gauss. The force of attraction between the anisotropic particles 50 in the oxide and the latter magnets 54 and 56, and the retarding action of this force on the particles as the tape moves past the magnets causes flowing of the oxide in directions longitudinally and laterally of the tape into a layer having a uniform thickness with a high degree of accuracy. This spreading or flowing action of the oxide is diagrammatically illustrated in FIGURE 14. Also, the lines of force in the magnetic field 53 extend substantially normal to the plane of the tape, as shown most clearly in FIGURE 13, so that as the tape moves through the field, particles 50 have unidirectional orientation imparted thereto. The intensity of the field 53 is made relatively high, on the order of 1200 gauss, as just noted, to achieve a high degree of unidirectional, perpendicular orientation of the particles 50 in the oxide. The field 53 may be made appreciably stronger than in existing methods and apparatus, and sufficiently strong to approach the particle orientation of FIGURE 3, since any resulting striations and other surface irregularities produced in the field are removed by a following modulated field, as discussed below.

Indicated at 58 and 60 are a pair of permanent magnets having facing north and south poles arranged at opposite sides of tape 32, as shown, and formed with concave pole faces. Rotatable in these concave pole faces are a pair of magnetic field modulating rotors 62 and 64 of magnetically permeable material. In practice, a freely rotatable sleeve, not shown, of some suitable magnetically non-permeable material, will be mounted on the upper rotor 62 and will bear against the side of the tape 32 opposite its oxide layer.

Referring to FIGURE 10, rotors 62 and 64 are slidably mounted on a pair of shafts 66 and connected for rotation therewith and limited axial movement thereon by pin and slot connections 68 between the respective rotors and shafts. Shafts 66 are connected for synchronized rotation by the gearing 70 and driven from a motor, not shown, so as to rotate in the directions indicated in FIGURES 6 and 12. The rotors 62 and 64 are identical and are formed with a series of circumferential V-shaped ribs 70 and 72 alternated as shown. Ribs 70 and 72 are eccentric and have their centers offset equal distances to opposite sides of the axes of rotation of their respective rotors, as may be seen most clearly in FIGURE 11. In one angular position of the rotors 62 and 64, the ribs 70 are off-set toward the tape 32 and the ribs 72 are offset away from the tape, as the rotors are viewed in FIGURE 10, and in angular positions of the rotors displaced 180° from the first mentioned angular positions, the ribs 70 are offset away from the tape and the ribs 72 are offset toward the tape.

Figures 15, 16, 17, 18, 19, 20:
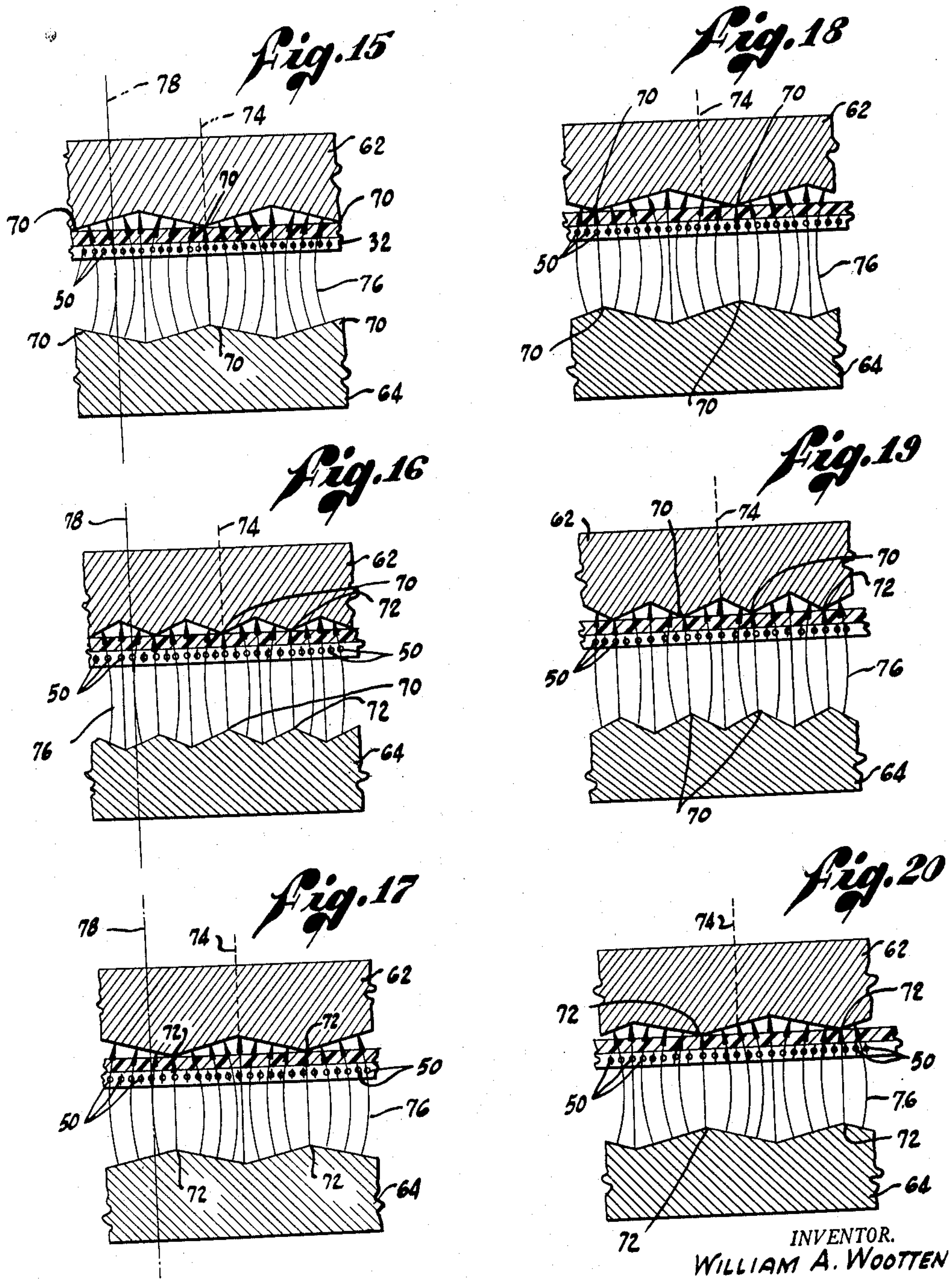
FIGURES 15–20 are enlarged details of portions of the mechanism shown in FIGURE 10 and illustrating the manner in which this mechanism accomplishes modulation of the magnetic field to joggle the particles in the magnetic oxide.

The rotors 62 and 64 are so relatively angularly orientated that the ribs 70 (and therefore also ribs 72) on the two rotors are 180° displaced relative to one another so as to be offset toward and away from the tape in synchronism as the rotors turn. Thus, in FIGURES 15, 16 and 17, the dotted line 74 represents a reference plane normal to axes of the rotors and passing through the apices of one pair of aligned ribs 70. In FIGURE 15 the two rotors 62 and 64 are angularly positioned so that the ribs 70 have maximum displacement toward the tape 32. In FIGURE 16, rotors 62 and 64 have been turned 90° from their positions of FIGURE 15 so that the ribs 70 and 72 on the two rotors have equal displacement toward the tape 32. In FIGURE 17, the rotors have been turned 180° from their positions of FIGURE 15 so that the ribs 72 have maximum displacement toward the tape.

As previously indicated, the rotors 62 and 64 are made of magnetically permeable material and, accordingly, form, in effect, a pair of pole pieces for the magnets 58 and 60 between which exists a magnetic field 76. According to conventional practice in the field of electricity and magnetism, external lines of magnetic force are considered to be directed from the north pole to the south pole of a magnet, and, as is well known, these lines of force tend to emanate from and be incident on pole faces normal to the latter. Accordingly, in the present apparatus, the lines of force comprising the magnetic field 76 are directed from the lower rotor 64 to the upper rotor 62 and emanate from and are incident on the inclined faces of the ribs 70 and 72 of the two rotors substantially normal to such faces, as shown. Also, the degree of bow of these force lines and the magnetic field intensity between the rotors will vary as the rotors turn due to the eccentricity of the latter which produces a continuous variation in the air gap between the rotors and aligned ribs thereon.

It will be observed from FIGURES 15–17, accordingly, that as the rotors 62 and 64 turn, portions of the magnetic field 76 are modulated both in intensity and direction relative to tape 32. Thus, in any given transverse plane of reference, say that designated by the numeral 78 in FIGURES 15–17, it will be noted that the force lines of the field 76 assume varying directions relative to the tape 32. Since the anisotropic particles 50 in the tape oxide tend to align themselves with their anisotropic axes paralleling these lines of force, it is thought that as the rotors turn, the particles are oscillated or "joggled" in accordance with varying inclination of the force lines relative to the tape in much the same manner as occurs by oscillation of the magnets 16 in FIGURE 4.

As pointed out previously in this description, this joggling of the particles apparently ends to compact them as well as to loosen them in the adhesive of the oxide sufficiently to promote their alignment with the force lines of the field. In operation of the apparatus, the field modulating rotors 62 and 64 are driven at relatively high angular velocities, on the order of 7,500 r.p.m. while the tape speed is on the order of 250 feet per minute so that each incremental length of the tape is subjected to a relatively large number of field modulations during passage between the rotors. The modulated field 76 is made somewhat weaker than field 53 and has a strength on the order of 500 gauss. Also, the field 76, while modulated, will be observed to possess a general perpendicular direction relative to the tape 32. Owing to these conditions and the fact that vibration of the particles occurs at a high frequency (due to the high speed of rotor rotation relative to the tape speed), the particles are rocked only slightly. Rocking of the particles is, therefore, in the nature of relatively high frequency vibrations. The degree of rocking of the particles has been exaggerated in the drawings for the sake of clarity. It is thought that during passage through the modulated field, the anisotropic particles in the oxide are, in effect, vibrated into even a higher state of perpendicular unidirectional orientation under the biasing effect of the generally perpendicularly directed components of the modulated field. Thus, the high degree of particle orientation achieved in the initial strong field 53 is not upset but, on the contrary, has been found to be increased.

It will be observed from FIGURES 15–17 that in planes of reference, such as plane 74, passing through the apices of the ribs 70 and 72 the field is modulated only in intensity, due to the variation in the spacing between the aligned ribs on the two rotors as the latter rotate, and not in direction. That is, the lines of force in these latter planes tend to lie always in such planes irrespective of the angular positioning of the rotors 62 and 64. While such modulation of field intensity does aid to some degree in orientating the particles, more effective orientation is achieved by modulation of the field in direction.

In order to subject the particles in the latter reference planes to directionally modulated fields, therefore, the invention proposes axial translation of the rotors relative to the tape during their rotation. Thus, in FIGURES 18–20 the rotors have been illustrated as being translated a distance equal to one half of the spacing between adjacent ribs 70 and 72. It will be observed that when the rotors turn in this latter axial position thereof, the particles which lie in the reference planes 74 are subjected to directionally modulated fields.

Various means may be employed for effecting translation of the rotor 62 and 64 during their rotation. For simplicity of illustration, the rotor translating means have been shown as comprising conventional, communicating cam grooves 80, of generally figure eight configuration, formed in the rotors in which engage cam followers 82 carried on supporting structure, not shown. During rotation of the rotors, the followers 82 are caused to track in one groove and then the other during rotation of the rotors to axially translate the latter the aforementioned distance. Thus, during operation of the apparatus, the rotors are rotated and translated at a high rate of speed to continuously subject substantially all of the anisotropic particles on the tape to directionally and intensity modulated magnetic fields.

It has been found that a primary, highly beneficial result achieved by modulation of the field 76, in addition to that result just discussed of vibrating the particles 50 into a highly, perpendicularly oriented state, is that of smoothing out any striations or other irregularities which are produced in the initial intense field 53. This smoothing action is thought to occur as a result of "beating" or "working" of the oxide by the constantly changing field conditions due to the vibrating of the anisotropic particles therein which tends to vibrate the oxide as a whole.

This "beating" or "working" action causes uniform redistribution of the oxide and smoothing out of the striations and other irregularities in its surface. Thus, tapes made by the present methods and apparatus are found to possess extremely smooth oxide surfaces very appreciably and noticeably smoother than the oxide surfaces on tapes produced by existing methods and apparatus. The oxide surfaces of my tapes actually possess a noticeable sheen or luster characteristic of highly polished oxide surfaces. Also, vibration of the particles tends to compact them as well as more uniformly disperse them throughout the oxide. The particle concentration per unit length of oxide is thus increased and the particle dispersion over the tape is more uniform. This is highly beneficial as previously noted.

After emergence from the modulated field, the tape is passed through a final, relatively weak constant magnetic field 84 in which the lines of force extend in predetermined angular relationship to the tape so as to retain the final desired orientation of the particles 50. This final field has a strength on the order of 100 gauss. In the form of the apparatus illustrated in FIGURE 6, this constant field is established by permanent magnets 86 and 88 having facing north and south poles so that the force lines comprising the field 84 extend substantially normal to the tape. A pair of relatively thin, spaced, parallel plates 90 and 92 of magnetically permeable material, fixed to the faces of the magnets 86 and 88 extend a distance in the direction of tape movement and terminate in outwardly turned edges, as shown. These plates act as pole pieces and serve to maintain more perpendicular field conditions at the exit end of the apparatus which gradually weaken in the direction of travel of the tape. The terminal ends of the plates are curved, as shown, to provide for abrupt dissipation of the field and avoid as much as possible non-perpendicular magnetic field conditions which would tend to misalign the particles on the tape. This gradual weakening and abrupt dissipation of the final field allows the tape to "escape," as it were, from the field of the apparatus without disturbing the highly oriented state of the particles.

This final field 84 may also impart some degree of final perpendicular, unidirectional orientation to the anisotropic particles 50. The particles are conditioned for maximum response to the final field, to accomplish any such final perpendicular, unidirectional orientation, closely approaching that illustrated in FIGURE 3, by the preceding modulated field.

Because of the above discussed smoothing effect on the oxide surface produced in the modulated field, the initial field 53 may have an intensity which magnetizes the particles 50 substantially to saturation. This tends to "interlock" the particles in their oriented state after emergence from the final field 84. Particle orientation is thereby preserved for a prolonged period of time sufficient to enable drying of the oxide out of the field without loss of orientation. This, in turn, enables the tape to be run at a higher rate which is desirable for increased production rates.

In some magnetic recording techniques, angular orientation of the anisotropic particles, other than perpendicular orientation, may be desirable. In such cases, the pole pieces 90 and 92 of the final orientation magnets 86 and 88 may be so configured as to produce the desired angular relationship between the lines of force in the final orientation field 84 and the tape. Thus, the inner surfaces of the pole pieces 90 and 92 might have a generally offset sawtooth configuration, as shown in FIGURE 7, to establish the desired angulated field direction. It may be desirable to increase the strength of the final field in such cases.

It will be observed in FIGURE 6 that magnets 54, 56 and 58, 60 have their like poles at opposite sides of the tape 32. The anisotropic particles on the tape are initially unmagnetized, but, become magnetized to a degree upon movement through the magnetic field 49 in the applicator assembly. Upon exit of the individual particles from the field 49, they will be orientated with their north poles uppermost due to the positioning of the south pole face 46 of the applicator magnet assembly 39 adjacent the exit end of the latter assembly. Upon entering the reversed field 53 of magnets 54, 56, therefore, the particles tend to be turned through 180 so as to have their north poles lowermost. The field 76 existing between magnets 58, 60 is reversed relative to the field 53 so that upon entering the field 76, the individual particles tend to be again rotated through 180°.

This reversal of the magnetic fields serves to additionally oscillate or "joggle" the anisotropic particles to further induce unidirectional orientation and compacting thereof. The final field 84 is in the same general direction as the modulated field 76 between the rotors 62 and 64 so as to preserve the perpendicular orientation the particles have acquired during their movement through the modulated field.

As preliminarily mentioned, high frequency magnetic recording techniques generally require longitudinal orientation of the anisotropic particles in the tape oxide. The modified method and apparatus illustrated in FIGURES 21–25 accomplishes such longitudinal orientation.

This latter apparatus is similar to the apparatus of FIGURE 6 in that it comprises an applicator assembly 100 and an orientation assembly 102. The applicator assembly 100 is identical to that of FIGURE 6, and, accordingly, no further discussion thereof is deemed necessary at this point.

The orientation assembly 102 comprises a pair of permanent magnets 104 and 106 which are generally U-shaped in cross-section, as shown, and elongated in a direction normal to the plane of the paper so as to have a length at least equal to the width of the tape 32.

The leading edges of these magnets are enlarged to form pole pieces 107 and 108 between which the tape 32 is fed. The magnets 104 and 106 have their north poles at these pole pieces, as shown. Owing to this opposing pole relationship, the lines of force in the magnetic field 110 at the entrance end of the orientation assembly repel one another so as to extend in substantial parallelism with and longitudinally of the tape in a plane midway between the pole pieces.

Accordingly, as the tape is moved through this field, with its oxide layer in a plane approximately midway between the pole pieces, the anisotropic particles 50 on the tape will be initially longitudinally aligned, as may be observed most clearly in FIGURE 22. Moreover, because of the opposite direction of the lines of force in the field 110, at opposite sides of the center plane of the pole pieces 107 and 108, the particles 50 are inverted as they cross that plane so as to be initially "joggled." The entrance poles 107 and 108 also accomplish flowing of the oxide into a smooth layer of substantially uniform thickness in much the same manner as do the entrance magnets 54, 56 in the apparatus of FIGURE 6.

Rotatable within the upper magnet 104 is a field modulating rotor 112 comprising a cylindrical drum of magnetically non-permeable material. This drum is supported for rotation on bearings, not shown, and has its periphery axially grooved for receiving a series of equally spaced bars 114 of magnetically permeable material. These bars 114 are rigidly secured to the rotor 112 in any suitable manner and have a length equal to that of the rotor.

Bars 114 provide the path of least reluctance between the north pole 107 of the magnet 104 and its south pole 116. Accordingly, the lines of force 118 in the magnetic field between these poles extend from the north pole 107 to the permeable bars 114 proximate thereto and thence from one bar to the next to the south pole 116, in the manner illustrated most clearly in FIGURE 22. Since drum 112 is nonmagnetically permeable, the lines of force 118 between adjacent bars 114 will bow outwardly from the periphery of the rotor, somewhat in the manner illustrated so as to cut through the tape 32 which moves in close proximity to the rotor. In practice, the modulating rotor will be encircled by a freely rotatable sleeve, not shown, for bearing against the tape on the side of the latter opposite its oxide layer.

When the apparatus is in operation, rotor 112 is driven, in the direction indicated, at a high angular velocity on the order of 7,500 r.p.m., while tape 32 is moved past the rotor at a speed on the order of 250 feet per minute. Accordingly, for short increments of time, the tape may be considered as being stationary.

As the rotor 112 turns, the lines of force 118 are, in effect, directionally modulated relative to any given point on the tape as may be observed in FIGURES 23–25 wherein the tape is considered to be stationary and two of the rotor bars 114 are shown in three sequential positions through which they move relative to the tape. Thus, as seen in these latter figures, any given particle 50 on the tape is subjected to a magnetic field which constantly changes in direction, relative to that particle, as the rotor turns. Since the particles tend to constantly align themselves with their anistropic axes paralleling the force lines, they will be oscillated or joggled in much the same manner as were the particles in the apparatus of FIGURE 6. The degree of joggling or rocking of the particles due to this modulation of the field relative to the tape will be slight, amounting actually to a vibration, due to the relatively high frequency of modulation created by the rotor. The degree of joggling has been exaggerated in FIGURES 23–25 for clarity. Also, it will be observed that a relatively constant, longitudinally directed field 118′ between the poles 108 and 122 (as well as between the poles 107 and 116) is superimposed in the plane of the tape on the modulated field 118. The field 118′ tends to "bias" the particles 50 to longitudinally oriented positions as they are vibrated.

This vibration of the particles accomplishes the same ends as in the previously described perpendicular orientating apparatus, namely, that of compacting the particles and more uniformly dispersing them in the oxide. Modulation of the field also removes any surface striations or other surface irregularities in the oxide for the reasons previously discussed. Further rotation of the rotor is believed to give rise to a magnetic "combing" action which tends to "comb" the particles into a high degree of longitudinal, unidirectional orientation; that is, as the rotor turns, the lines of force in the field 118 between the rotor bars 114 "comb" through the oxide at a high rate and tend to align the particles in longitudinal planes of the tape. Also, the particles are conditioned for maximum response to a final field 120 which may serve to impart a degree of longitudinal orientation to the particles.

This final longitudinal field exists between the facing south poles 116 and 122 of the magnets 104 and 106. Because of the opposing pole arrangement, the lines of force in this exit field will, in a central plane, generally parallel and extend substantially longitudinally of the tape in the same manner as the force lines in the entrance field 110. As the tape moves through the field 120, in this central plane, the anisotropic particles in the tape oxide may tend to finally align themselves to a high degree of unidirectional orientation, with their anisotropic axes extending longitudinally of the tape. A sleeve 124 of magnetically permeable material is fixed between the faces of poles 116 and 122 to provide a longitudinal field at the exit end of the apparatus. This field gradually diminishes in the direction of tape travel and allows the tape to "escape" from the field without disturbing the particle orientation.

In the modified apparatus of FIGURE 32 the lower magnet 106 and exit sleeve 124 have been omitted. Also, the upper magnet 104′ in FIGURE 32 has its poles inclined toward and terminating in pole faces spaced slightly from the rotor. The magnetic field 118″ between the poles follows the shortest path of least reluctance which is through the bars 114 of the rotor around the lower periphery of the latter. Between the rotor bars, the force lines bow outwardly from the rotor in a manner similar to that illustrated in FIGURES 23–25.

During passage of the tape 32 through the field 118″, with rotor 112 turning, the anisotropic particles in the tape oxide are joggled or vibrated in the manner described with reference to FIGURES 23–25. The particles are thereby compacted and loosened in the binder of the oxide and acquire a degree of unidirectional orientation.

The amplitude of this vibration gradually diminishes as a partciular portion of the tape passes through the exit field and the particles gradually assume a generally unidirectional state under the action of the relatively constant and gradually weakening components of the exit field. In the alternative, a second magnet 106′ may be located in the rotor drum 112′, as illustrated in FIGURE 33, to create a stronger field through the rotor. An oxide spreading magnet M may follow the magnet assembly 104′, 106′.

The apparatus illustrated in FIGURES 26–31 is designed to produce transverse orientation of the anisotropic particles in the oxide of the magnetic tape as is desirable for video recording systems. Only the orientating assembly of this latter apparatus has been illustrated, but it should be understood that the latter apparatus will also embody an applicator assembly identical to that previously described for laying a uniform layer of oxide on the tape prior to passage of the latter through the orientation assembly.

The orientation assembly illustrated comprises a pair of entrance magnets 127 and 128 of unlike polarity which establish an entrance magnetic field 129 through which the tape 32 moves. This field tends to smooth out the oxide on the tape into a uniform layer as in the previous forms of the invention. Following the magnets 127 and 128 is an elongate, generally U-shaped permanent magnetic structure 130 having north and south poles 131 and 132, respectively, formed with concave pole faces. Rotatable in the concavities of these pole faces is a field modulating rotor assembly 134 including drum 136 of magnetic non-permeable material, such as stainless steel. Drum 136 has a reduced shaft 138 coupled to a motor 140 for driving of the rotor in an anticlockwise direction as indicated by the arrow in FIGURE 27. As shown in this latter figure, the axis of rotation of the rotor is offset inwardly of the magnet assembly relative to the centers of the faces of poles 131 and 132 so that the shortest path between the poles is around the lower peripheral portion of the rotor 136, as viewed in FIGURE 27.

The magnetic tape 32 is fed in close proximity to the rotor 134 with its oxide layer remote from the rotor. In a practical embodiment of the present apparatus, the rotor 134 is preferably contained within an outer freely rotatable sleeve (not shown) of plastic or other magnetically non-permeable material against which the tape 32 bears as in the previously described forms of the invention.

As most clearly illustrated in FIGURE 26, the magnet 130 and the rotor 134 are arranged with their axes extending obliquely relative to the direction of movement of the tape 32 for reasons to be presently seen. Rigidly fixed in a series of circumferentially spaced, helically extending slots formed in the periphery of the drum 136 are a series of helically configured bars 142 of magnetically permeable material, such as 1018 low carbon steel. These bars have such a pitch, that for the particular angle between the axis of the rotor and the longitudinal axis of the tape, direction lines normal to the bars 142 in the portion of the rotor most proximate to the tape 32 extend substantially normal to the longitudinal axis of the tape and substantially parallel to the plane of the latter.

It will be evident that the point of closest approach of a given bar 142 to the tape is at zone of intersection of the plane P passing through the axis of rotation of the rotor normal to the tape, and the given bar. It will also be evident in view of the helical configurations of the bars that this point of closest approach of a given bar to the tape will initially be at one end of the bar (see FIGURE 28) as that end crosses the plane P. This point of closest approach of the bar will thereafter progress diagonally across the tape along the line of intersection of the plane P and the tape.

The rotor 134 is located in the magnetic field between the poles 131 and 132. The lines of force 144 in this field follow the path of least reluctance from the north pole 131 to the south pole 132, which path includes the permeable bars 142. Since the shortest leg of this path is around the lower peripheral portion of the rotor (as viewed in FIGURE 27) proximate to the tape 32, maximum magnetic flux flow will occur from the north pole 131 to those bars which are instantaneously proximate to the latter pole and thence from one of the bars 142 to the next, around the portion of the rotor closest to the tape 32, to the south pole 132.

As is well known in the art, and as was previously mentioned, magnetic lines of force tend to emanate from and be incident on faces normal to the latter, and, accordingly, the lines of magnetic force 144 in the field between adjacent bars 142 extend in planes substantially normal to the bars at each point therealong. As any given pair of adjacent bars turn through their positions of closest approach to the tape, the lines of magnetic force 144 cutting through the tape in the instantaneous zone of closest approach, which zone, as previously indicated, progresses diagonally across the tape as the rotor turns, extend in planes substantially normal to the longitudinal axis of the tape (see FIGURE 26). Since the anisotropic particles in the oxide of the tape tend to orientate themselves with their anisotropic axes paralleling these lines of force, generally transverse orientation of the particles is achieved.

Referring now to FIGURES 29–31, it will be observed that due to the aforementioned progression of the zone of the closest approach of the bars to the tape diagonally across the latter as the rotor turns and the outward bow or curvature of the magnetic force lines in the air gap between adjacent bars, each particle 50 in the tape oxide along this diagonal path will be subjected to a directionally modulated transverse magnetic field in a manner similar to that illustrated in FIGURES 23–25. This tends to joggle or vibrate the particle in a plane substantially normal to the longitudinal axis of the tape. Moreover, the particles on the tape are subjected to an intensity modulated magnetic field, owing to the constant variation in the spacing between any given point on the tape and the rotor bars as the rotor turns, as well as a magnetic "combing" action of the character previously discussed.

Accordingly, it will be apparent that the apparatus of FIGURE 26 accomplishes modulation both in intensity and direction of the transverse magnetic field 144 to which the particles 50 are subjected during passage through the orientation assembly. This achieves compacting uniform dispersion and generally transverse unidirectional orientation of the particles. As in previous forms of the invention, this modulation of the field also accomplishes smoothing out of surface striations and other surface irregularities of the oxide. Vibration of the particles also conditions them for maximum response to a final exit field as in the previous forms of apparatus. After leaving the rotor 134, the tape passes through a final constant transverse magnetic field 146 between a pair of magnetic poles 148 and 150 which may tend to finally unidirectionally orientate the particles transversely of the tape. A pair of field-direction-retaining and dissipation plates 151 are provided on the magnets 148 and 150 to permit the tape to "escape" from the apparatus without disturbing of the particle orientation, as previously discussed.

The angle between the rotor and tape and/or the pitch of the bars 142 may be varied to achieve the desired direction of the magnetic fields between adjacent bars, in the zone of closest approach of the latter to the tape, relative to the axis of the tape. Thus, the fields in this zone may be made to extend generally normal to the axis of the tape, as described above, or at some oblique angle by providing the proper inclination between the bars and tape axis. The holding field 146 would be similarly directed relative to the tape.

It is conceivable, that a tape having one or more of the three above described modes of particle orientation may be produced by first applying to the tape a first oxide strip and passing the tape through one of the other forms of apparatus to achieve different orientation of the second strip after the fisrt strip has dried.

In all of the above forms of the invention, a single strip of oxide having a width substantially equal to that of the tape may be laid on the latter or several narrower parallel strips may be applied to the tape by appropriate design of the applicator roller. To avoid undesirable end effects in the several magnetic fields of the various forms of the invention, existing adjacent the ends of the magnets which establish those fields, it is desirable that the magnets extend a distance beyond the edges of the tape so that the portions of the fields through which the tape passes are as uniform and unidirectional as possible. It is thought possible that in lieu of employing oscillating magnets or modulating rotors to vibrate the magnetic particles on the tape, such vibrating may be accomplished by subjecting the tape to relatively high frequency electromagnetic radiation.

As heretofore noted, the above described methods and apparatus produce magnetic recording tape having greater sensitivity, higher quality and more favorable magnetic recording characteristics than heretofore possible. More particularly, it has been found that magnetic recording tapes made in accordance with this invention have oxide layers possessing an appreciably smoother surface which actually exhibits a "sheen" or polished appearance characteristic of polished oxide surfaces. Mechanical polishing of the surface is, therefore, not necessary so that the oxide layer contains substantially no embedded foreign matter. The oxide layers are also of more uniform thickness in directions both longitudinally and transversely of the tape. Finally, the dispersion of the anisotropic particles in the oxide is appreciably more uniform over the length of the tape and the particles are more compacted so that the particle concentration per unit length of the oxide is increased.

As regards orientation, tests outlined below indicate that a substantially higher degree of unidirectional orientation of the anisotropic particles in the oxide is achieved by the present invention. Also, higher magnetic field intensities may be employed resulting in magnetization of the particles more to saturation. The particles thereby tend to become effectively interlocked in their unidirectionally oriented state so that drying of the oxide in the field is not necessary to preserve the orientation.

All of these factors contribute to provide magnetic recording tapes, made in accordance with the invention, with a higher signal/noise ratio, improved higher frequency response, increased uniformity of output along the tape and improved consistency between successively produced tapes.

As evidence of the improved characteristics of tapes made in accordance with this invention, there is presented below an outline of and illustrative results of tests conducted by an independent research facility. During this test, tapes of this invention were compared with existing tapes on the market, at least one of which appears, under microscopic examination, to be longitudinally oriented.

The magnetic oxide with which the tested tapes of this invention were coated were supplied by the C. K Williams Company of East St. Louis, Missouri. The anisotropic particles contained in the oxide were acicular in shape and composed of $Fe_3O_4$, designated as I.R.N. 220.

Evalution tests were made on two rolls of striped film made in accordance with this invention and bearing oxide from the source identified above. The oxide was longitudinally oriented by apparatus of the character illustrated in FIGURE 22. Also tested were one roll each of fully coated film from three different vendors of magnetic tape. Using the test set-up as shown in FIGURE 37, the following method for evaluating the films was used:

Using a frequency of 400 cycles, the gain set VI was adjusted for +10 dbm level (approximately 10 db below 100%). The bias level control was adjusted for maximum reading of Ballantine No. 2. Then the bias level reading on Ballantine No. 1 was decreased until the reading on Ballantine No. 2 was .2 db lower than the maximum point. This then becomes the maximum bias sensitivity point.

With the established bias at 400 cycles, the level was adjusted until 1% and/or 2.5% distortion was obtained at the output of the playback amplifier. This lift VI level becomes the 100% level (approximately +17 to +22 dbm).

While recording 400 cycles at the 100% level the reading was noted on Ballantine No. 2. Then the 400 cycle signal was removed, leaving only the bias, and another reading on Ballantine No. 2 was obtained. The difference between the first and second readings then becomes the signal to noise ratio.

The equipment was equalized to play back flat, using a roll of 3-M fully coated film.

Using the above method, the following data was obtained:

| | Vendor's Tape | | | Present tape | |
|---|---|---|---|---|---|
| | A | B | C | Roll #1 | Roll #2 |
| Bias (68 kc.), 100% Level ma | 10.2 | 10.0 | 12.4 | 9.0 | 9.2 |
| 1% Dist dbm | 18.6 | 17.6 | 23.5 | 16.0 | 16.0 |
| Playback Output v | 1.05 | 1.05 | 2.8 | .84 | .82 |
| 2.5% Dist dbm | 22.5 | 22.5 | 26.0 | 20.75 | 20.75 |
| Playback Output v | 1.6 | 1.55 | 3.8 | 1.35 | 1.34 |

As will be evident to those skilled in the art, the above figures are indicative of the relative sensitivity of the tapes tested. The increased sensitivity of the tapes made by the present method will be immediately apparent.

Additional tests, involving the test procedure outlined above, were conducted on the three vendors' tapes, identified above as A, B and C, and six rolls of the present tape bearing oxide of the type noted above and longitudinally oriented in accordance with this invention. The following figures on signal/noise ratio were obtained.

| Vendor's Tape | | | Present Tape |
|---|---|---|---|
| A, db | B, db | C, db | |
| 52.0 | 54.0 | 53.0 | Average of six rolls: 56.5. Average of four best rolls: 58.0. |

The superior signal-noise ratio obtainable by the present invention will be obvious from these figures.

During these tests, the relative frequency responses of the tapes were determined. The following table gives illustrative results of this determination for the three vendors' tapes and two sample tapes of this invention.

*Relative Frequency Response*

| Frequency (c.p.s.) | Vendor's Tape | | | Present Tape | |
|---|---|---|---|---|---|
| | A | B | C | #1 | #2 |
| 40 | −0.5 | −0.2 | 0 | +0.2 | +0.9 |
| 100 | −0.4 | +1.3 | +1.5 | +0.6 | +0.9 |
| 400 | +0.2 | +0.2 | +0.4 | 0 | +0.5 |
| 1,000 | 0 | 0 | 0 | 0 | 0 |
| 4,000 | 0 | +0.3 | −1.2 | +0.4 | +0.5 |
| 8,000 | −0.8 | −0.2 | −3.5 | −0.1 | −0.1 |
| 10,000 | −2.5 | −1.5 | −5.2 | −1.5 | −1.3 |
| 12,000 | −5.0 | −3.5 | −7.9 | −4.0 | −3.3 |

Finally, a sample tape of the invention exhibited a maximum 1½ db drop-out, while the vendors' tapes showed maximum drop-outs of 5 db, 6 db and 1½ db, respectively.

It will be immediately evident from the overall results of these tests that tapes made in accordance with this invention display generally improved characteristics and that the improvements achieved in signal/noise ratio and sensitivity are especially pronounced.

As preliminarily indicated, the principles of the invention may be employed in the manufacture of ferromagnetic media, such as magnetic recording tapes, magnetic memory drums, transformer cores, and the like, by spraying, electroplating and sputtering processes, as diagrammatically illustrated in FIGURES 34–36. In each of the latter figures, the numeral 200 denotes a magnet assembly similar to that illustrated in FIGURE 33. In each case, the magnet assembly 200 provides a magnetic field having both modulated, generally unidirectional components and relatively constant, unidirectional components, as was described with reference to FIGURE 33.

In FIGURE 34 a spray head or nozzle 201 is contained in a casing 202. Nozzle 201 directs a spray 203 of molten ferromagnetic material or a ferromagnetic oxide paint, from a source not shown, onto the underside of a carrier web or tape 204. Carrier tape 204 may comprise any suitable material, such as are commonly employed as bases in magnetic recording tapes, for example. An inner shield 205 confines the spray 203 at the tape 204 while trays 206 are provided to catch the excess material in the spray.

Tape 204 is fed through the spray in the direction indicated, so as to have a coating of the sprayed material applied thereto. Magnetic recording tapes or tapes for use in spiral wound transformer cores might be made by this spraying technique, for example.

Previous attempts to make magnetic recording tapes, for instance, by such a spraying operation have not proved satisfactory for the reason that the oxide coating obtained exhibits so-called stratification characteristics. This stratification of the oxide layer results in the tape possessing unfavorable recording and reproducing characteristics.

This invention proposes to spray the oxide, or molten ferromagnetic material, onto the tape 204 in the presence of the modulated magnetic field created by the magnet assembly 200. The particles or droplets of the material in the spray 203 are subjected to and influenced by the modulated field in the zone of the tape 204 in a manner similar to that described with reference to the previous modulated fields. As a result of this magnetic field modulation, the material is distributed more uniformly on the tape and the tendency for the material to stratify is appreciably overcome. The relatively constant, unidirectional components in the field of the assembly 200 also tend to unidirectionally orient the anisotropic particles in the case of a magnetic oxide spray.

Conceivably, a magnetic memory drum might be made by this process by revolving a non-permeable base cylinder, enclosing the rotor 112' of the assembly 200 in the spray 203. The rotor and cylinder are preferably revolved at different speeds. The magnetic assembly 200 serves the same purpose as in the case of coating the tape 204.

In FIGURE 35 there is illustrated apparatus for applying, by electro-deposition, a coating of ferromagnetic material to a tape 300 bearing a thin layer of copper (not shown) or other electrically conductive material. In this case, the modulating assembly 200 is located directly below a tank 301 of non-permeable material. This tank contains an iron-depositing electrolyte 302 through which the tape 301 is fed, as shown.

Bearing on the copper-layer of the tape 300 is an electrical contact roller 303 which is electrically connected to the negative terminal of a D.C. voltage source 304. The positive terminal of voltage source 304 is electrically connected to a cylindric anode 305, immersed in the electrolyte 302. Anode 305 conforms substantially in curvature to and is slightly spaced from the rotor 112' of the assembly 200 as shown. The tank wall between the rotor and anode may cylindrically curve, as shown. Tape 300 is fed between the rotor and anode in the direction indicated.

During operation of the apparatus, thus far described, the positive ions of the iron salt in the electrolyte 302 migrate toward and become deposited on the metallic coating of the moving tape 300 to form on the latter a ferromagnetic layer.

Under normal conditions, this layer is extremely compact and exhibits coercivity and saturation values too high for magnetic recording applications. The magnetic field modulating assembly 200 is provided to overcome these deficiencies.

Thus, as the positive ions of the iron salt in the electrolyte migrate toward the tape, they are subjected to the modulated magnetic field of the assembly 200 which penetrates to the zone of the tape. Owing to the interaction between the modulated magnetic field and the electrical fields of the positively charged ions, the latter tend to spiral around the force lines of the magnetic field during their movement toward the tape.

Owing to the constant change in direction and intensity of this magnetic field, ions are caused to be deposited on the tape in other than their normal extremely compact pattern. There results a ferromagnetic layer which is appreciably less compact and possesses a somewhat "spongy" quality, characteristic of magnetic oxides. Also, tapes made by normal electrodeposition methods tend to exhibit excessive orientation characteristics which are counteracted to a degree by the modulated magnetic field. Tapes made by the electro-deposition method of this invention, therefore, possess improved magnetic recording characteristics.

Finally, in FIGURE 36, the invention is shown as applied to the manufacture of magnetic tape and the like by a so-called "sputtering" process. In FIGURE 36 the numeral 400 denotes a housing which may be evacuated. Respectively, 401 and 402 are supply and take-up reels between which a tape 403 is fed in the direction indicated past the present magnetic field modulating assembly 200. Tape 403 is similar to tape 300 in FIGURE 35 in that it bears a thin metallic layer.

Directly below the assembly 200 is fixed a ceramic cup 404 which opens toward the tape 403. An induction heating coil 405, connected to a high frequency voltage source 406, encircles the cup 404. Indicated at 407 is a spool from which an iron wire 408, or the like, is automatically fed by means not shown, upwardly through the center of cup 404. A D.C. supply 409 has one terminal connected to the metallic layer of tape 403 through a contact roller 410. The other terminal of the D.C. supply is connected to the wire 408 by a contact brush 411.

In operation of the apparatus, the induction heating coil 405 is energized from the high frequency source 406 to vaporize the wire 408 as the latter feeds into the cup 404. The minute molten globules of iron in the vapor 412 will migrate toward and be deposited on the tape 403 aided by electrostatic attraction resulting from the connections of D.C. source 409 to the tape and wire 408.

In ordinary sputtering processes of this character, the iron layer deposited on the tape will be extremely dense and compact so that a recording tape made in this way will possess the above-noted deficiencies. In the present method, however, owing to the charge on the molten particles in the vapor 412, the particles will be influenced by the modulated magnetic field generated by the assembly 200. The normal pattern of deposition of the vapor particles is thereby altered in a manner similar to that outlined with reference to FIGURE 35. Magnetic tapes made in accordance with the present sputtering technique, therefore, possess the more favorable characteristics mentioned.

In each of the three last-mentioned applications, the magnetic assembly 200 enables a more rapid rate of deposition of the ferromagnetic layer on the tape and results in a smoother surface on the layer.

It will be apparent from the foregoing description that there has been described and illustrated apparatus and processes which are fully capable of attaining the objects and advantages and which possess all of the features preliminarily set forth. While certain embodiments of the apparatus have been described and illustrated, it should be understood that they are illustrative rather than limiting in nature and that numerous modifications in instrumentalities, design and arrangement of parts are possible within the scope of the following claims.

I claim:

1. A method of treating magnetic recording tape bearing a layer of magnetic anisotropic particles in an adhesive binder comprising the steps of: passing the tape through a non-reversing magnetic field between spaced magnetic elements while the binder is in a viscous state, and rapidly moving said elements relative to the tape as said tape is passed through the field in directions to repeatedly vibrate said field through an angle relative to the tape at points of said field within said layer.

2. A method of treating magnetic recording tape bearing a layer of magnetic anisotropic particles in an adhesive binder to improve sensitivity to a magnetic recording field having a predetermined direction relative to the tape, that comprises: linearly moving said tape along a predetermined guide path through a treatment region with said binder in a viscous state, producing a magnetic field between spaced magnetic elements, positioning said magnetic elements to pass said field through the layer of magnetic particles on the portion of said tape in said treatment region, and rapidly moving said magnetic elements relative to said portion of the tape so as to repeatedly vary the direction of said field at points within said layer on said portion of the tape through an angle which extends to opposite sides of said predetermined direction.

3. The method of claim 2, including positioning the magnetic elements on one side of the tape and so as to locate the lines of force of the magnetic field therebetween in planes which are substantially parallel to the tape and at right angles thereto, and moving said elements so as to angularly vary the direction of the field at points within said layer to opposite sides of the longitudinal direction of the tape.

4. The method of claim 2, including positioning the magnetic elements on one side of the tape, and wherein the movement imparted to said elements is characterized by repeated passages thereof closely adjacent said portion of the tape in a circular arc pathway.

5. The method of claim 2, including positioning the magnetic elements on opposite sides of the tape, so as to pass the magnetic field transversely through the layer of anisotropic particles on the tape.

6. The method of claim 2, including positioning the magnetic elements to pass the magnetic field through the layer of anisotropic particles generally transversely across the tape.

7. The method of treating a magnetic recording tape bearing a layer of magnetic anisotropic particles in a wet adhesive binder, comprising the steps of longitudinally driving said tape, subjecting said layer of anisotropic particles on the tape to a magnetic field, and vibrating said field through an angle relative to the tape.

8. The subject matter of claim 7, wherein said magnetic field is so disposed that the lines of force thereof are in planes which are substantially parallel to the tape and at right angles thereto, and wherein said field at individual points within said layer is angularly vibrated to opposite sides of the longitudinal direction of the tape.

9. The subject matter of claim 7, wherein said magnetic field is so disposed that the lines of force thereof are in planes which are substantially perpendicular to the longitudinal direction of the tape, and wherein said field at individual points within said layer is angularly vibrated to opposite sides of perpendiculars to the tape.

10. The subject matter of claim 7, wherein said magnetic field is so disposed that the lines of force thereof are in planes which are substantially perpendicular to the longitudinal direction of the tape, and wherein said field at individual points within said layer is angularly vibrated to opposite sides of the plane of the tape.

11. The method of producing a magnetic recording tape comprising a tape base bearing a magnetizable layer of anisotropic ferromagnetic substance, the comprises: longitudinally moving said tape, subjecting said layer of anisotropic ferromagnetic substance on the moving tape to a magnetic field, and vibrating said field through an angle at individual points within the layer of ferromagnetic substance to opposite sides of a predetermined direction line relative to the tape.

12. In the manufacture of magnetic recording media, such as magnetic recording tape, including a base bearing a layer of ferromagnetic substance, the method of applying said substance to the base comprising the steps of passing said base through a magnetic field, vibrating said field through an angle relative to the tape, and supplying the ferromagnetic substance in the form of a vapor adjacent said base and within the region of said angularly vibrating magnetic field, whereby the vaporized substance deposits on said base in the region of said angularly vibrated field.

13. In the manufacture of magnetic recording media, such as magnetic recording tape, including a base, and a layer of ferromagnetic substance on said base, the method of applying said substance to the base comprising the steps of passing said base through a magnetic field, vibrating said field through an angle relative to the tape, and depositing said ferromagnetic substance on the base by electrodeposition within the region of said angularly vibrating magnetic field.

14. Apparatus for treating a traveling magnetic recording tape bearing a layer of anisotropic ferromagnetic substance, comprising: a pair of parallel magnetically permeable drums spaced with a magnetic gap therebetween for said tape to run therethrough, means for effecting rotation of at least one of said drums, magnet means having pole faces of opposite polarity, one positioned adjacent each of said drums, whereby a magnetic field extends from one of said pole faces to the adjacent drum, from said drum transversely across said gap and through the tape to the other drum, and from the last-mentioned drum to the pole face adjacent to the latter, and coacting formations on the peripheries of said drums for oscillating the magnetic field extending therebetween through an angle relative to the intervening tape in response to drum rotation.

15. The subject matter of claim 14, including means for rotating said drums in synchronism with one another, and wherein said formations on each of said drums comprise a succession of circular ribs of substantially V-shaped profile, of which the centers of alternate ribs are oppositely offset relative to the axis of rotation of the drum.

16. In combination, means for moving a magnetic tape bearing a layer of anisotropic ferromagnetic substance thereon, a non-magnetic rotor body arranged for rotation with its periphery adjacent a surface of said moving tape, magnetically permeable bars mounted on the periphery of said rotor body and extending generally transversely thereacross in spaced relation and in substantial parallelism to one another, said rotor body embodying substance of low magnetic permeability between said bars, in such a manner as to separate said bars from one another by magnetic field paths of high reluctance, said bars turning with said rotor in relatively close proximity to the tape, and a magnet having pole pieces positioned in proximity to and ahead of and beyond a circumferential extent of the rotor that turns adjacent the tape, whereby a magnetic field extends from one pole piece through an air gap to an adjacent permeable bar, and thence through successive magnetic gaps from bar to bar to the other pole piece, with the magnetic fields in the gaps between successive bars passing through the layer of anisotropic substance on the tape during rotation of said rotor.

17. The subject matter of claim 16, wherein the axis of the rotor is transverse to the tape.

18. The subject matter of claim 16, wherein said bars extend helically about said rotor.

19. The subject matter of claim 16, wherein said bars extend helically about said rotor, and the axis of said rotor is inclined to the direction of tape travel, at an angle such that the magnetic field extends transversely of the tape.

References Cited in the file of this patent

UNITED STATES PATENTS

| | | |
|---|---|---|
| 1,949,840 | Languepin | Mar. 6, 1934 |
| 1,974,441 | Andersen | Sept. 25, 1934 |
| 2,033,991 | Melton et al. | Mar. 17, 1936 |
| 2,210,770 | Muller-Ernesti | Aug. 6, 1940 |
| 2,254,531 | Kirchner et al. | Sept. 2, 1941 |
| 2,384,500 | Stoll | Sept. 11, 1945 |
| 2,405,662 | McManus et al. | Aug. 13, 1946 |
| 2,408,144 | Huebner | Sept. 24, 1946 |
| 2,418,479 | Pratt et al. | Apr. 8, 1947 |
| 2,570,856 | Pratt et al. | Oct. 9, 1951 |
| 2,711,901 | Von Behren | June 28, 1955 |
| 2,792,563 | Rajchman | May 14, 1957 |
| 2,796,359 | Speed | June 18, 1957 |
| 2,826,166 | Davis | Mar. 11, 1958 |
| 2,853,402 | Blois | Sept. 23, 1958 |
| 3,001,891 | Stoller | Sept. 26, 1961 |

FOREIGN PATENTS

| | | |
|---|---|---|
| 572,409 | Great Britain | Oct. 8, 1945 |
| 751,842 | Great Britain | July 4, 1956 |

OTHER REFERENCES

Thompson: Dynamo-Electric Machinery, vol. 1, pp. 61–62 and 427, Spon and Chamberlain, New York, 1902.